(12) United States Patent
Takaura et al.

(10) Patent No.: US 7,048,388 B2
(45) Date of Patent: May 23, 2006

(54) PROJECTION OPTICAL SYSTEM, MAGNIFICATION PROJECTION OPTICAL SYSTEM, MAGNIFICATION PROJECTION APPARATUS, AND IMAGE PROJECTION APPARATUS

(75) Inventors: Atsushi Takaura, Tokyo (JP); Kazuhiro Fujita, Tokyo (JP); Nobuo Sakuma, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 59 days.

(21) Appl. No.: 10/771,523

(22) Filed: Feb. 5, 2004

(65) Prior Publication Data

US 2004/0156117 A1 Aug. 12, 2004

(30) Foreign Application Priority Data

| Feb. 6, 2003 | (JP) | ............................. 2003-029595 |
| Feb. 6, 2003 | (JP) | ............................. 2003-029602 |
| Dec. 8, 2003 | (JP) | ............................. 2003-409304 |

(51) Int. Cl.
G03B 21/14 (2006.01)
G03B 21/22 (2006.01)
G03B 21/26 (2006.01)
G03B 21/28 (2006.01)
G03B 13/22 (2006.01)

(52) U.S. Cl. ............................. 353/99; 353/30; 353/70; 353/77; 353/102; 359/663; 359/668; 359/727

(58) Field of Classification Search .................. 353/30, 353/37, 69, 70, 77, 99, 102, 31; 359/663, 359/668, 727, 730, 731
See application file for complete search history.

(56) References Cited

U.S. PATENT DOCUMENTS 3,982,116 A 9/1976 Sakuma ...................... 240/1.3

(Continued)

FOREIGN PATENT DOCUMENTS

JP 6-91641 11/1994

(Continued)

OTHER PUBLICATIONS

U.S. Appl. No. 10/125,493, filed Apr. 19, 2002, Yamauchi et al.

(Continued)

*Primary Examiner*—Melissa Jan Koval
(74) *Attorney, Agent, or Firm*—Oblon, Spivak, McClelland, Maier & Neustadt, P.C.

(57) ABSTRACT

A projection optical system guiding and projecting a light beam from a projected object surface onto a projection surface in an upstream-downstream direction through a transmission dioptric system and a reflection dioptric system. An intermediate image surface of the projected object surface is positioned closer to the reflection dioptric system than to the transmission dioptric system, and an intermediate image on the intermediate image surface is formed as the final image on the projection surface via the reflecting mirrors, which include at least one anamorphic polynomial free-formed surface having different vertical and lateral powers. A light beam from the reflection dioptric system to the projection surface is guided at an angle to a normal of the projection surface and the transmission dioptric system is decentered with respect to a normal of the projected object surface, the transmission refractive elements prevented from being decentered with respect to each other.

24 Claims, 13 Drawing Sheets

U.S. PATENT DOCUMENTS

| | | | | |
|---|---|---|---|---|
| 4,154,500 | A | 5/1979 | Funato et al. | 350/96.25 |
| 4,436,407 | A | 3/1984 | Satomi et al. | 355/11 |
| 4,571,035 | A | 2/1986 | Sakuma | 350/443 |
| 4,586,782 | A | 5/1986 | Sakuma et al. | 350/6.5 |
| 4,627,685 | A | 12/1986 | Sakuma | 350/6.8 |
| 4,695,132 | A | 9/1987 | Sakuma | 350/409 |
| 4,707,085 | A | 11/1987 | Takanashi et al. | 350/480 |
| 4,712,884 | A | 12/1987 | Sakuma et al. | 350/474 |
| 4,756,585 | A | 7/1988 | Kaneko et al. | 350/6.8 |
| 4,758,059 | A | 7/1988 | Sakuma | 350/6.8 |
| 4,770,517 | A | 9/1988 | Sakuma | 350/479 |
| 4,932,734 | A | 6/1990 | Sakuma et al. | 350/6.8 |
| 4,934,772 | A | 6/1990 | Sakuma et al. | 350/6.5 |
| 4,935,911 | A | 6/1990 | Ohuchida et al. | 369/44.11 |
| 4,943,128 | A | 7/1990 | Takada et al. | 350/6.9 |
| 4,953,171 | A | 8/1990 | Nakajima et al. | 372/44 |
| 4,955,682 | A | 9/1990 | Yamaguchi et al. | 350/6.1 |
| 5,005,928 | A | 4/1991 | Suzuki et al. | 350/6.1 |
| 5,060,212 | A | 10/1991 | Fujita et al. | 369/44.12 |
| 5,097,462 | A | 3/1992 | Fujita et al. | 369/109 |
| 5,107,477 | A | 4/1992 | Fujita et al. | 369/44.24 |
| 5,128,795 | A | 7/1992 | Endou et al. | 359/207 |
| 5,155,616 | A | 10/1992 | Yamaguchi et al. | 359/216 |
| 5,157,534 | A | 10/1992 | Endou et al. | 359/205 |
| 5,170,278 | A | 12/1992 | Wada et al. | 359/212 |
| 5,233,454 | A | 8/1993 | Sakuma et al. | 359/196 |
| 5,233,455 | A | 8/1993 | Yamaguchi et al. | 359/205 |
| 5,373,390 | A | 12/1994 | Sakuma | 359/208 |
| 5,408,095 | A | 4/1995 | Atsuumi et al. | 250/236 |
| 5,426,298 | A | 6/1995 | Sakuma et al. | 250/235 |
| 5,604,606 | A | 2/1997 | Miyashita et al. | 358/474 |
| 5,606,181 | A | 2/1997 | Sakuma et al. | 257/88 |
| 5,666,220 | A | 9/1997 | Sakuma | 359/208 |
| 5,729,349 | A | 3/1998 | Tomita et al. | 356/429 |
| 5,852,499 | A | 12/1998 | Tomita et al. | 356/429 |
| 5,907,438 | A | 5/1999 | Fujita et al. | 359/619 |
| 5,970,034 | A | 10/1999 | Sakuma et al. | 369/44.38 |
| 6,177,667 | B1 | 1/2001 | Fujita et al. | 250/216 |
| 6,181,473 | B1 | 1/2001 | Fujita et al. | 359/621 |
| 6,292,305 | B1 | 9/2001 | Sakuma et al. | 359/649 |
| 6,545,803 | B1 | 4/2003 | Sakuma et al. | 359/472 |
| 6,754,162 | B1 | 6/2004 | Fujita et al. | 369/112.05 |
| 2002/0003755 | A1 | 1/2002 | Fujita et al. | 369/44.23 |
| 2002/0176255 | A1 | 11/2002 | Yamauchi et al. | 362/299 |
| 2004/0156117 | A1 | 8/2004 | Takaura et al. | |

FOREIGN PATENT DOCUMENTS

| | | |
|---|---|---|
| JP | 2001-264627 | 9/2001 |
| JP | 2001-324675 | 11/2001 |
| JP | 2002-40326 | 2/2002 |
| JP | 2002-57963 | 2/2002 |
| JP | 2002/174853 | 6/2002 |
| JP | 2002-296503 | 10/2002 |

OTHER PUBLICATIONS

U.S. Appl. No. 09/897,668, filed Jul. 2, 2001, Fujita et al.
U.S. Appl. No. 10/328,006, filed Dec. 26, 2002, Fujita et al.
U.S. Appl. No. 10/370,737, filed Feb. 24, 2003, Miyagaki et al.
U.S. Appl. No. 10/771,523, filed Feb. 5, 2004, Takaura et al.
U.S. Appl. No. 10/994,321, filed Nov. 23, 2004, Miyagaki et al.

ILLUMINATION LIGHT

PROJECTION OPTICAL SYSTEM, MAGNIFICATION PROJECTION OPTICAL SYSTEM, MAGNIFICATION PROJECTION APPARATUS, AND IMAGE PROJECTION APPARATUS

BACKGROUND OF THE INVENTION

1. Field of the Invention

The present invention relates to a projection optical system, a magnification projection optical system, a magnification projection apparatus, and an image projection apparatus.

2. Description of the Related Art

Liquid crystal projectors are widely known as image projection apparatuses. In these days, the liquid crystal projectors have employed liquid crystal panels with higher resolution, have enjoyed improved brightness due to higher efficiencies of light source lamps, and have become less expensive.

Further, small, light-weight image projection apparatuses using a DMD (Digital Micromirror Device) have been widely used not only in offices and schools but also at home. Particularly, the portability of front-type projectors has been improved so that they are also used in small meetings.

It is desired that projectors, or image projection apparatuses, be able to project a large-screen image. That is, it is desired to enlarge a projection screen. Further, it is also desired that a projection space required outside a projector be reduced as much as possible.

In order to reduce the outside projection space while enlarging the projection screen, it is desirable to incorporate the light path of an imaging light beam forming a projected image as much as possible in the projector (image projection apparatus). The following patent-related documents disclose image projection apparatuses employing such technique.

Japanese Laid-Open Patent Application No. 2002-40326 (Prior Art 1) discloses an image projection apparatus including first through fourth reflecting mirrors to obtain a wider angle of view while preventing an imaging optical system from becoming larger in size. The first reflecting mirror has a concave shape and each of the second through fourth reflecting mirrors has a convex shape. The imaging optical system is composed of the first through fourth reflecting mirrors. At least one of the first through fourth reflecting mirrors has a free-form surface so as to ensure projection performance.

Japanese Laid-Open Patent Application No. 2002-174853 (Prior Art 2) discloses an image projection apparatus that is a surface projection type display whose projection distance to a screen is reduced. The surface projection type display includes an imaging optical system composed of a pair of a concave mirror and a convex mirror having divergence action and a projection lens.

Japanese Examined Patent Application Publication No. 6-91641 (Prior Art 3) discloses an image projection apparatus that is a video projector. The first mirror surface of the imaging optical system of the video projector has a convex shape so as to reduce the thickness of the video projector.

The image projection methods of Prior Art 1 and 3 perform image formation using only one or more reflecting mirrors to magnify and project a single light valve image on a screen. Therefore, these image projection methods enjoy the merit of no generation of chromatic aberration in principle. In the case of displaying images of red, green, and blue separately, using three light valves instead of a single light valve, and combining the separate images on a screen, the intervention of a color combining part such as a cross prism or a Philips prism is necessary, thus resulting in the generation of chromatic aberration at the time of combining colors. However, the imaging optical system composed of only reflecting surfaces cannot correct chromatic aberration.

According to an image projection apparatus disclosed in Japanese Laid-Open Patent Application No. 2001-264627 (Prior Art 4), each light beam from an image display panel is guided to a screen successively by the positive-power imaging lens system and the reflection optical system including a negative-power curved surface mirror of a magnification projection optical system to be focused onto the screen.

The screen and the imaging lens system are set so that the height of the screen is offset from the height of the imaging lens system. The light beams are reflected back from the mirror to be guided to the screen. Therefore, the optical path length of the imaging light beam differs between the upper side and the lower side of the center part of the magnified projected image on the screen (corresponding to the center part of the image display panel), thus resulting in the generation of a so-called "trapezoidal distortion."

The trapezoidal distortion is correctable by "keystone correction," which, however, is likely to degrade the quality of the magnified image on the screen.

It is well known to provide a convex mirror between the imaging lens system and the screen so that the convex mirror is decentered with respect to the optical axis of the imaging lens system in order to reduce the trapezoidal distortion. In the case of providing the convex mirror with decentration, the convex mirror is provided on the imaging lens side of the screen-side focus position of the imaging lens system so as to extend the focus position of a projection lens by the negative refracting power of the convex mirror.

In order to realize a low-profile, large-screen magnification projection apparatus with the above-described configuration, the negative power of the convex mirror may be increased to widen an angle of view. This, however, requires stricter shape accuracy and stricter assembly tolerance of the convex mirror, and also increases distortion.

Distortion may be reduced by decreasing the refractive power of the convex mirror by increasing the distance between the imaging lens system and the convex mirror. As the distance between the imaging lens system and the convex mirror increases, however, the convex mirror becomes larger in size to increase its cost. Further, the magnification projection apparatus is also likely to become larger in size.

According to Japanese Laid-Open Patent Application No. 2002-296503, a magnification projection optical system is composed of only reflecting mirrors. In the case of thus obtaining desired optical performance without using a lens optical system, it is necessary to set the surface accuracy and position accuracy of each reflecting surface to extremely high values, thus requiring stricter assembly accuracy of the magnification projection optical system.

SUMMARY OF THE INVENTION

Accordingly, it is a general object of the present invention to provide a projection optical system, a magnification projection optical system, a magnification projection apparatus, and an image projection apparatus in which the above-described disadvantages are eliminated.

A more specific object of the present invention is to provide a projection optical system, a magnification projection optical system, and a magnification projection apparatus that can increase a projection screen in size, employ an imaging optical system including a reflecting surface to reduce a projection space outside a projection apparatus, and at the same time, correct chromatic aberration.

Another more specific object of the present invention is to provide an image projection apparatus including such a projection optical system.

Yet another more specific object of the present invention is to reduce the thickness of an image projection apparatus and perform projection on a large screen without distortion.

One or more of the above-described objects of the present invention are achieved by a projection optical system for use in an image projection apparatus illuminating a light valve forming an image in accordance with a modulating signal with illumination light from a light source, the projection optical system including first and second optical systems arranged along an optical path defining an upstream-downstream direction in an order described from upstream to downstream on a downstream side of the light valve, wherein the first optical system includes at least one dioptric system and has positive power; the second optical system includes at least one reflecting surface having power and has positive power; and the image formed by the light valve is formed as an intermediate image in the optical path, and the intermediate image is magnified and projected.

The above-described projection optical system includes a first optical system and a second optical system. The image formed by the light valve is formed as an intermediate image in the optical path of the first and second optical systems, and the intermediate image is further magnified and projected. Accordingly, high projection magnification can be realized. Since the first optical system includes a dioptric system, chromatic aberration is correctable using the chromatic dispersion characteristic even in the case of employing a color composite prism. Further, since the optical path of imaging light beams is folded back by a reflecting surface of the second optical system, the projection optical system can be made compact.

One or more of the above objects of the present invention are also achieved by an image projection apparatus that illuminates a light valve forming an image in accordance with a modulating signal with illumination light from a light source, the image projection apparatus including: a projection optical system, the projection optical system including first and second optical systems arranged along an optical path defining an upstream-downstream direction in an order described from upstream to downstream on a downstream side of the light valve, wherein the first optical system includes at least one dioptric system and has positive power; the second optical system includes at least one reflecting surface having power and has positive power; and the image formed by the light valve is formed as an intermediate image in the optical path, and the intermediate image is magnified and projected by the projection optical system.

The above-described image projection apparatus can be made compact with a long optical path of image light beams being provided in a space in the apparatus. As a result, a large-size image can be projected and displayed with a reduced projection space outside the apparatus.

One or more of the above objects of the present invention are also achieved by a magnification projection optical system that guides a light beam from an image display panel to a screen in an upstream-downstream direction, projects the light beam from a direction inclined to a normal of the screen, and forms on the screen a magnified version of an image displayed on the image display panel, the magnification projection optical system including: a reflection optical system; and a transmission optical system, wherein the reflection optical system includes a plurality of reflecting surfaces having power and includes at least one rotationally asymmetric reflecting surface.; and the transmission optical system includes a transmitting surface having refractive power and includes at least one aspheric surface.

One or more of the above objects of the present invention are also achieved by a magnification projection optical system that guides a light beam from an image display panel to a screen in an upstream-downstream direction, projects the light beam from a direction inclined to a normal of the screen, and forms on the screen a magnified version of an image displayed on the image display panel, the magnification projection optical system including: a transmission optical system including a plurality of transmitting surfaces; a reflection optical system including a plurality of reflecting surfaces; and a diaphragm, wherein one of the reflecting surfaces, on which a light beam passing through the diaphragm is made incident first, has negative power.

One or more of the above objects of the present invention are also achieved by a magnification projection optical system that guides a light beam from an image display panel to a screen in an upstream-downstream direction, projects the light beam from a direction inclined to a normal of the screen, and forms on the screen a magnified version of an image displayed on the image display panel, wherein a position and a shape of an intermediate image of the image display panel formed with negative magnification by light beams traveling from the image display panel to the screen are substantially identical to a position and a shape, respectively, of an intermediate image of the screen formed with negative magnification by light beams traveling from the screen to the image display panel.

The above-described magnification projection optical systems can project the image on the image display panel as a large screen with little distortion.

One or more of the above objects of the present invention are also achieved by a magnification projection apparatus that: displays an image on an image display panel; illuminates the image display panel with light from a light source; and by a magnification projection optical system, guides a light beam from the image display panel to a screen in an upstream-downstream direction, projects the light beam from a direction inclined to a normal of the screen, and forms on the screen a magnified version of the image displayed on the image display panel, wherein: the magnification projection optical system comprises a reflection optical system and a transmission optical system; the reflection optical system includes a plurality of reflecting surfaces having power and includes at least one rotationally asymmetric reflecting surface; and the transmission optical system includes a transmitting surface having refractive power and includes at least one aspheric surface.

One or more of the above objects of the present invention are also achieved by a magnification projection apparatus that: displays an image on an image display panel; illuminates the image display panel with light from a light source; and by a magnification projection optical system, guides a light beam from the image display panel to a screen in an upstream-downstream direction, projects the light beam from a direction inclined to a normal of the screen, and forms on the screen a magnified version of the image displayed on the image display panel, wherein: the magnification projection optical system comprises: a transmission optical system including a plurality of transmitting surfaces; a reflection optical system including a plurality of reflecting surfaces; and a diaphragm; and one of the reflecting surfaces, on which a light beam passing through the diaphragm is made incident first, has negative power.

One or more of the above objects of the present invention are also achieved by a magnification projection apparatus that: displays an image on an image display panel; illuminates the image display panel with light from a light source; and by a magnification projection optical system, guides a light beam from the image display panel to a screen in an upstream-downstream direction, projects the light beam from a direction inclined to a normal of the screen, and forms on the screen a magnified version of the image displayed on the image display panel, wherein a position and a shape of an intermediate image of the image display panel formed with negative magnification by light beams traveling from the image display panel to the screen are substantially identical to a position and a shape, respectively, of an intermediate image of the screen formed with negative magnification by light beams traveling from the screen to the image display panel.

The above-described magnification projection apparatuses can be realized with a low-profile configuration.

One or more of the above objects of the present invention are also achieved by a projection optical system, including: a first optical system including at least one dioptric system and having positive power; and a second optical system including one or more reflecting surfaces having power, the second optical system having positive power as a whole, wherein the first and second optical systems are arranged along an optical path defining an upstream-downstream direction in an order described from upstream to downstream on a downstream side of an object surface; an object image is temporarily formed as an intermediate image, and thereafter, is formed as a final image; and in respect to an optical axis of an optical element positioned at a furthest upstream end of the first optical system and having refractive power, at least one of other optical elements is shifted or tilted.

One or more of the above objects of the present invention are also achieved by a projection optical system, including: a first optical system including at least one dioptric system and having positive power; and a second optical system including one or more reflecting surfaces having power, the second optical system having positive power as a whole, wherein the first and second optical systems are arranged along an optical path defining an upstream-downstream direction in an order described from upstream to downstream on a downstream side of an object surface; an object image is temporarily formed as an intermediate image, and thereafter, is formed as a final image; and in the first optical system, with respect to an optical axis of one of optical elements of the first optical system, which one is positioned at a furthest upstream end of the first optical system and has refractive power, the other optical elements are prevented from being tilted.

According to the above-described projection optical systems, the first optical system forms an intermediate image, and the second optical system magnifies and projects the intermediate image, thereby increasing the (enlarging) magnification of the composition of the optical systems. Since the first optical system includes a dioptric system, chromatic aberration is correctable using the chromatic dispersion characteristic even in the case of employing a color composite prism. Further, by causing lens elements forming the dioptric system to be shifted or tilted, reverse distortion can be generated effectively in the intermediate image so as to prevent distortion from occurring in the projected image.

One or more of the above objects of the present invention are also achieved by an image projection apparatus that, by a projection optical system, guides a light beam from an image display panel to a screen and forms on the screen a final version of the image displayed on the image display panel, wherein: the projection optical system includes: a first optical system including at least one dioptric system and having positive power; and a second optical system including one or more reflecting surfaces having power, the second optical system having positive power as a whole; the first and second optical systems are arranged along an optical path defining an upstream-downstream direction in an order described from upstream to downstream on a downstream side of an object surface; an object image is temporarily formed as an intermediate image, and thereafter, is formed as a final image; and with respect to an optical axis of an optical element positioned at a furthest upstream end of the first optical system and having refractive power, at least one of other optical elements is shifted or tilted.

One or more of the above objects of the present invention are also achieved by an image projection apparatus that, by a projection optical system, guides a light beam from an image display panel to a screen and forms on the screen a final version of the image displayed on the image display panel, wherein: the projection optical system includes: a first optical system including at least one dioptric system and having positive power; and a second optical system including one or more reflecting surfaces having power, the second optical system having positive power as a whole; the first and second optical systems are arranged along an optical path defining an upstream-downstream direction in an order described from upstream to downstream on a downstream end of an object surface; an object image is temporarily formed as an intermediate image, and thereafter, is formed as a final image; and in the first optical system, with respect to an optical axis of one of optical elements of the first optical system, which one is positioned at a furthest upstream end of the first optical system and has refractive power, the other optical elements are prevented from being tilted.

The above-described image projection apparatuses can perform extremely close range projection with a desired (enlarging) magnification.

One or more of the above objects of the present invention are also achieved by a projection optical system guiding and projecting a light beam from a projected object surface onto a projection surface in an upstream-downstream direction through a transmission dioptric system and a reflection dioptric system of one or two reflecting mirrors, wherein: the transmission dioptric system includes a plurality of transmission refractive elements; substantial telecentricity is provided from the projected object surface up to a first surface of the transmission dioptric system; an intermediate image surface of the projected object surface is positioned closer to the reflection dioptric system than to the transmission dioptric system, and an intermediate image on the intermediate image surface is formed as a final image on the projection surface via the reflecting mirrors; the reflecting mirrors include at least one anamorphic polynomial free-form surface having different vertical and lateral powers; a light beam from the reflection dioptric system to the projection surface is guided at an angle to a normal of the projection surface; and the transmission dioptric system is decentered with respect to a normal of the projected object surface, and the transmission refractive elements of the transmission dioptric system are prevented from being decentered with respect to each other.

One or more of the above objects of the present invention are also achieved by a projection optical system guiding and projecting a light beam from a projected object surface onto a projection surface in an upstream-downstream direction through a transmission dioptric system and a reflection dioptric system of one or two reflecting mirrors, wherein: the transmission dioptric system includes a plurality of transmission refractive elements; substantial telecentricity is provided from the projected object surface up to a first surface of the transmission dioptric system; an intermediate image surface of the projected object surface is positioned closer to the reflection dioptric system than to the transmission dioptric system, and an intermediate image on the intermediate image surface is formed as a final image on the projection surface via the reflecting mirrors; the reflecting mirrors include at least one anamorphic polynomial free-form surface having different vertical and lateral powers; a light beam from the reflection dioptric system to the projection surface is guided at an angle to a normal of the projection surface; and the transmission dioptric system is decentered with respect to a normal of the projected object surface, and the transmission refractive elements of the transmission dioptric system are prevented from being decentered with respect to each other at a group unit level.

The above-described projection optical systems can project a large screen without distortion.

One or more of the above objects of the present invention are also achieved by an image projection apparatus magnifying an image displayed on a projected object surface and projecting the magnified image on a projection surface by a projection optical system, wherein: the projection optical system guides and projects a light beam from the projected object surface onto the projection surface in an upstream-downstream direction through a transmission dioptric system and a reflection dioptric system of one or two reflecting mirrors; the transmission dioptric system includes a plurality of transmission refractive elements; substantial telecentricity is provided from the projected object surface up to a first surface of the transmission dioptric system; an intermediate image surface of the projected object surface is positioned closer to the reflection dioptric system than to the transmission dioptric system, and an intermediate image on the intermediate image surface is formed as a final image on the projection surface via the reflecting mirrors; the reflecting mirrors include at least one anamorphic polynomial free-form surface having different vertical and lateral powers; a light beam from the reflection dioptric system to the projection surface is guided at an angle to a normal of the projection surface; and the transmission dioptric system is decentered with respect to a normal of the projected object surface, and the transmission refractive elements of the transmission dioptric system are prevented from being decentered with respect to each other.

One or more of the above objects of the present invention are further achieved by an image projection apparatus magnifying an image displayed on a projected object surface and projecting the magnified image on a projection surface by a projection optical system, wherein: the projection optical system guides and projects a light beam from the projected object surface onto the projection surface in an upstream-downstream direction through a transmission dioptric system and a reflection dioptric system of one or two reflecting mirrors;

the transmission dioptric system includes a plurality of transmission refractive elements;

substantial telecentricity is provided from the projected object surface up to a first surface of the transmission dioptric system;

an intermediate image surface of the projected object surface is positioned closer to the reflection dioptric system than to the transmission dioptric system, and an intermediate image on the intermediate image surface is formed as a final image on the projection surface via the reflecting mirrors; the reflecting mirrors include at least one anamorphic polynomial free-form surface having different vertical and lateral powers; a light beam from the reflection dioptric system to the projection surface is guided at an angle to a normal of the projection surface; and the transmission dioptric system is decentered with respect to a normal of the projected object surface, and the transmission refractive elements of the transmission dioptric system are prevented from being decentered with respect to each other at a group unit level.

As will be appreciated, the above-described image projection apparatuses can be formed with a low-profile configuration.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given below, with reference to the accompanying drawings, of embodiments of the present invention.

Figure 1:
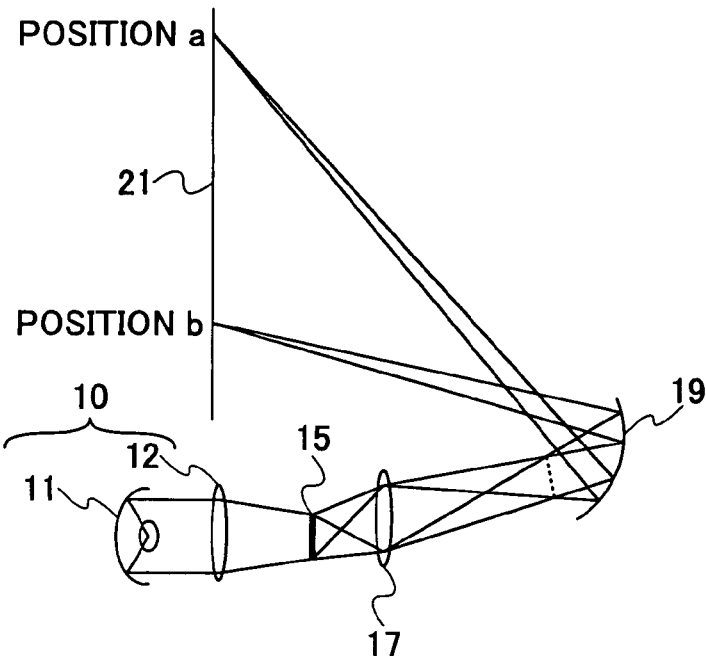
FIG. 1 is a diagram for illustrating a projection optical system and an image projection apparatus according to an embodiment of the present invention.

FIG. 1 is a schematic diagram showing part of an image projection apparatus according to an embodiment of the present invention.

Referring to FIG. 1, the image projection apparatus includes a light valve 15, which is a liquid crystal panel in this embodiment. The light valve 15 is hereinafter referred to simply as a panel 15. The image projection apparatus further includes a light source 10 composed of a light emitting part 11 and an illumination optical system 12. The light emitting part 11 is composed of a lamp and a reflector. A light beam from the light emitting part 11 is illumination light in the illumination optical system 12. The illumination light from the light source 10 illuminates the panel 15.

An image is formed on the panel 15 in accordance with a modulating signal, and the formed image subjects the light beam from the light source 10 to two-dimensional intensity modulation, and transmits the intensity-modulated light beam. The light beam transmitted through the panel 15 is projected and focused onto a screen 21 by a projection optical system composed of a first optical system 17 and a second optical system 19, so that a magnified version of the image formed on the panel 15 is displayed.

In light transmission, the panel 15 side may be referred to as the upstream side and the screen 21 side may be referred to as the downstream side.

Figure 2:
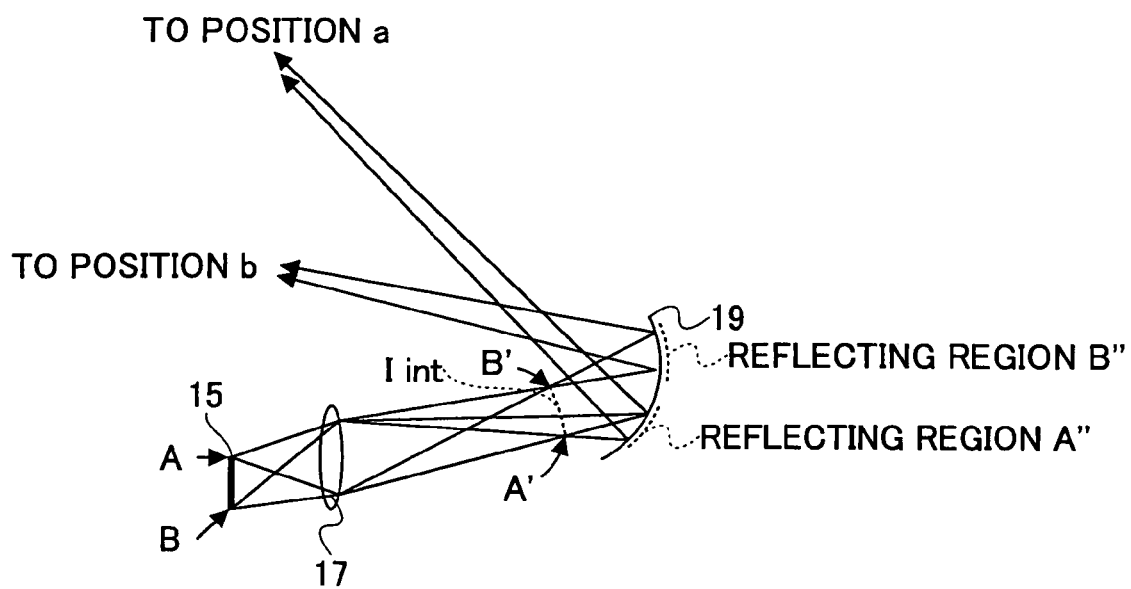
FIG. 2 is a diagram for illustrating the projection optical system of FIG. 1 according to the present invention.

FIG. 2 is a diagram for illustrating the projection optical system of the image projection apparatus of FIG. 1.

Referring to FIG. 2, the first and second optical systems 17 and 19 are provided in the order described from upstream to downstream on the projection or downstream side of the panel 15. The first optical system 17 is a dioptric system (lens) having positive power. The second optical system 19 includes a reflecting surface having power, and has positive power.

The image formed by the panel 15 is formed as an intermediate image $I_{int}$ in the optical path of the first and second optical systems 17 and 19. A magnified version of the intermediate image $I_{int}$ is projected and formed on the screen 21.

The first optical system 17 is shown as a single lens in FIG. 2. Specifically, however, various modes including a dioptric system, such as a configuration of a plurality of lenses, a combination of a lens and a mirror, and the configuration of integrated reflecting and refracting surfaces, are also applicable to the first optical system 17.

The first optical system 17 has positive power as a whole. As shown in FIG. 2, the intermediate image $I_{int}$ formed by the first optical system 17 is an inverted version of the image formed on the panel 15. The intermediate image $I_{int}$ is preferably a one to several times magnified image of the image on the panel 15. If the intermediate image $I_{int}$ is a reduced image the second optical system 19 is required to have high enlarging magnification so that the first and second optical systems 17 and 19 as a whole obtain a displayed image of high magnification. This makes it difficult to realize a balance between aberration correction and high magnification.

On the other hand, if the enlarging magnification of the intermediate image $I_{int}$ becomes too high, the second optical system 19 needs to be larger in size, thus increasing the projection optical system and consequently the image projection apparatus in size.

FIG. 2 shows the optical paths of light beams traveling from positions A and B on the panel 15 corresponding to a maximum image height point on the plus (+) side (a position a in FIG. 1) and a maximum image height point on the minus (−) side (a position b in FIG. 1), respectively, toward the positions a and b.

The intermediate image $I_{int}$ is not necessarily required to be formed on a plane. It is sufficient to ensure the performance of the composite optical system of the first and second optical systems 17 and 19 as a whole so that a satisfactory image is projected onto the screen 21 by the composite optical system. Accordingly, no particular restriction is imposed on the imaging performance by the first optical system 17.

According to the configuration of FIGS. 1 and 2, each light beam forming the intermediate image $I_{int}$ by the first optical system 17 is reflected by the second optical system 19 to have its optical path folded-back so that an image is projected in the direction opposite to the direction in which the light beam forming the intermediate image $I_{int}$ travels.

According to the configuration of FIGS. 1 and 2, the second optical system 19 is composed of a single-surface concave mirror. Alternatively, the second optical system 19 may include two or more reflecting surfaces. Further, the second optical system 19 may also include a dioptric system together with a reflecting surface.

In the configuration of FIGS. 1 and 2, a single reflecting surface may be added to the second optical system 19 so as to reverse the direction of each finally projected light beam of FIG. 1. Further, in the configuration of FIGS. 1 and 2, a dioptric system (lens system) may be provided as part of the second optical system 19 between the reflecting surface thereof and the position where the intermediate image $I_{int}$ is formed so as to capture quantity of light more efficiently onto the reflecting surface of the second optical system 19.

As shown in FIG. 2, the light beam starting at the position A on the panel 15 converges to have a center of gravity at a position A' in the intermediate image $I_{int}$. The light beam after the convergence diverges at an angle of divergence equal to a collection angle, and is reflected from the second optical system 19 having positive power to be focused onto the position a on the screen 21 in FIG. 1.

Likewise, the light beam starting at the position B on the panel 15 converges to have a center of gravity at a position B' in the intermediate image $I_{int}$. The light beam after the convergence diverges at an angle of divergence equal to a collection angle, and is reflected from the second optical system 19 having positive power to be focused onto the position b on the screen 21 in FIG. 1.

By forming the intermediate image $I_{int}$, it is possible to locally narrow the effective region of the reflecting surface of the second optical system 19, the effective region contributing to the image formation of the light beams traveling from the positions A and B on the panel 15. That is, as shown in FIG. 2, the imaging performance for the light beam traveling from the position A is affected by the figure of a reflecting region A" of the second optical system 19, and the imaging performance for the light beam traveling from the position B is affected by the figure of a reflecting region B" of the second optical system 19.

Accordingly, the configuration of FIGS. 1 and 2 can optimize the figure of each of the reflecting regions A" and B". Inversely, it is possible to control characteristics of light collection to each part on the screen 21 by locally changing the figure of the concave surface of the second optical system 19.

Particularly, its effect can be maximized by providing the concave surface with a free-form surface figure.

Optimum data setting may be performed by a conventionally known simulation method such as ray tracing. Since the optimization can be performed based on the reflecting surface, it is possible to perform such design as to prevent the generation of or an increase in chromatic aberration and at the same time improve other light collection characteristics.

Since the first optical system 17 includes a dioptric system, it is possible to correct chromatic aberration, which is uncorrectable by only a reflecting surface, by the dioptric system.

Further, aberrations that affect the image projected on the screen 21 and cannot be corrected by only the reflecting surface of the second optical system 19 may be corrected by actively incorporating a dioptric system in the second optical system 19.

In the configuration of FIG. 1, the imaging magnification of the second optical system 19 may be increased by bringing the position where the intermediate image $I_{int}$ is formed closer to the reflecting surface of the second optical system 19. This is described below with reference to FIGS. 3 and 4.

Figure 3:
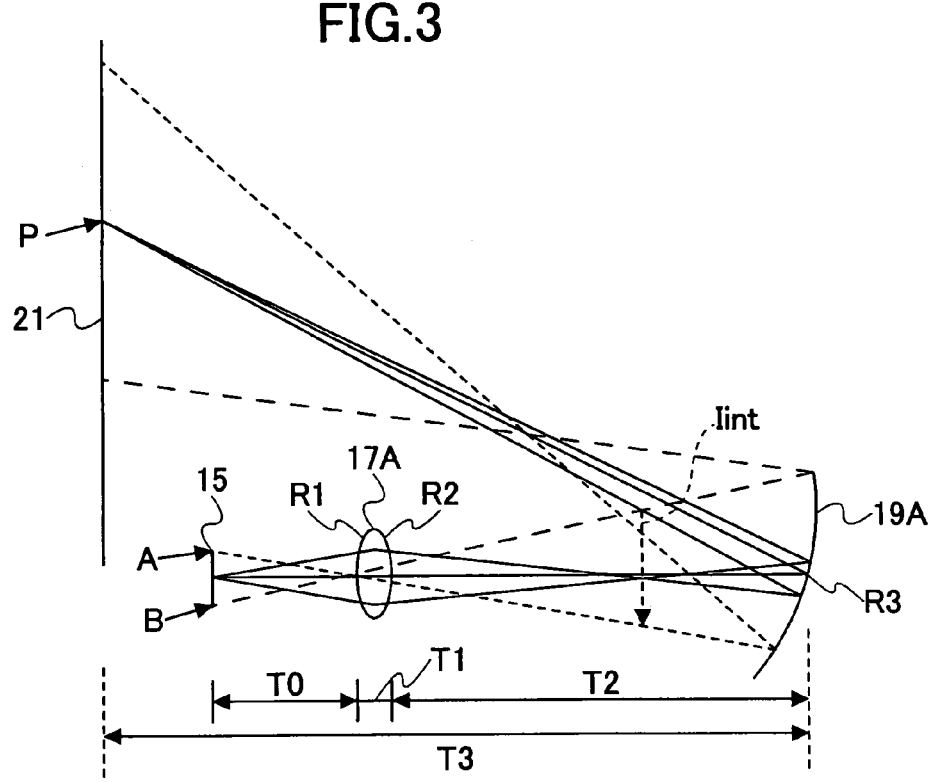
FIG. 3 is a diagram for illustrating a configuration of the projection optical system of FIG. 1 according to the present invention.
Figure 4:
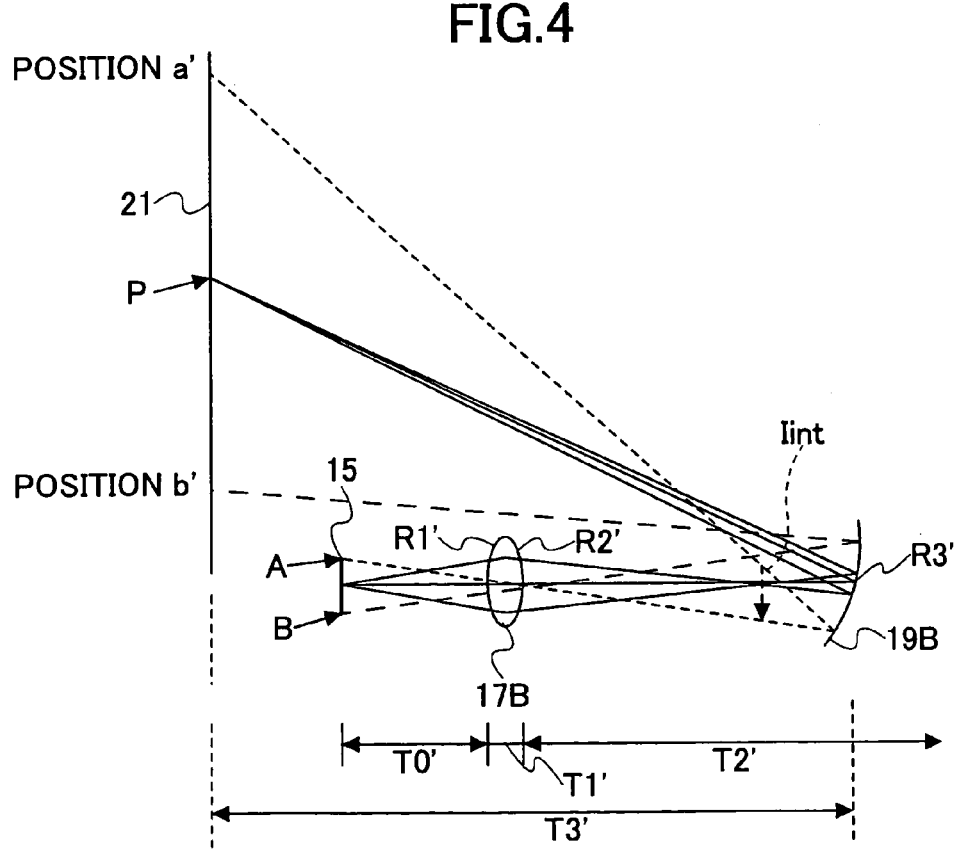
FIG. 4 is a diagram for illustrating a configuration of the projection optical system of FIG. 1 according to the present invention.

In FIGS. 3 and 4, reference numeral 15 denotes the panel, reference numeral 17A denotes a first optical system (a lens), reference numeral 19A denotes a second optical system (a concave mirror), and reference numeral 21 denotes the screen.

In accordance with the notation of optical system data, the radius of curvature of the $i^{th}$ surface from the panel 15 is referred to as Ri (i=1 through 3; the first surface (i=1) is the entrance surface of the first optical system 17A; the third surface (i=3) is the reflecting surface of the second optical system 19A), and the surface separation between the $i^{th}$ surface and the $(i+1)^{th}$ surface is referred to as Ti (i=0 through 3; the $0^{th}$ surface separation (i=0) is the distance between the panel 15 and the entrance surface of the first optical system 17A; the third surface separation (i=3) is the distance between the second optical system 19A and the screen 21).

The data of the optical system of FIG. 3 is as follows:

| i | Ri (mm) | Ti (mm) | Material |
|---|---|---|---|
| 0 |  | 85 |  |
| 1 | 65 | 25 | BK7 |
| 2 | −55 | 225 |  |
| 3 | −135 | −400 |  |

An object height on the panel 15 is ±7.5 mm.

When a setting is provided such that the projected image is optimally formed at an image height position 0 (a point P on the screen 21), the distance between principal rays starting from the positions A and B on the panel 15 that is an object and reaching the positions a and b on the screen 21, respectively, is approximately 208 mm.

On the other hand, in FIG. 4, a first optical system 17B and a second optical system 19B are employed. The power of the first optical system 17B is reduced so that the position of the intermediate image $I_{int}$ moves away from the first optical system 17B. At the same time, the positive power of the second optical system 19B is controlled while maintaining the positional relationship so that light collection characteristics at the image height 0 are maintained. The data of the optical system in this case is as follows.

| i | Ri' (mm) | Ti' (mm) | Material |
|---|---|---|---|
| 0 |  | 85 |  |
| 1 | 65 | 25 | BK7 |
| 2 | −60 | 225 |  |
| 3 | −98 | −400 |  |

An object height on the panel 15 is ±7.5 mm.

The optical arrangement of FIG. 4 is drawn differently from that of FIG. 3 for convenience of description. As is apparent from the above-described data, however, the optical arrangement of FIG. 4 is substantially equal to that of FIG. 3. In the optical arrangement of FIG. 4, the curvature of the exit surface of the first optical system 17B and the curvature of the reflecting surface of the second optical system 19B are different from those of the firsthand second optical systems 17A and 19A, respectively.

In the case of FIG. 4, the distance between principal rays starting from the positions A and B on the panel 15 and reaching positions a' and b' on the screen 21, respectively, is approximately 362 mm. In the case of FIG. 4, the magnification increases compared with the case of FIG. 3, where the distance between principal rays is 208 mm. That is, the positive power of the first optical system 17B is reduced and the intermediate image $I_{int}$ is closer to the reflecting surface having positive power of the second optical system 19B, thus resulting in an increased magnification. As described above, a magnification can be increased by only changing the radius of curvature of each of a refracting surface and a reflecting surface without changing an optical arrangement.

The above-described matter may be implemented by providing, on the light valve side of the intermediate image (the side upstream of the intermediate image in the upstream-downstream direction from the panel 15 to the screen 21) in the optical path of the first and second optical systems, an optical element having negative power for bringing the position at which the intermediate image is formed close to the reflecting surface having positive power of the second optical system.

As the above-described negative-power optical element, a concave lens, a Fresnel concave lens, a convex reflecting mirror, or a composite system thereof may be employed, for instance.

Actually, it is necessary to ensure light collection (condensing) characteristics at each image height position and to correct the distortion of an image surface. The latitude of design may be increased by increasing the number of refracting and reflecting surfaces so that design optimization may be performed by a conventionally known simulation such as ray tracing.

Figure 5:
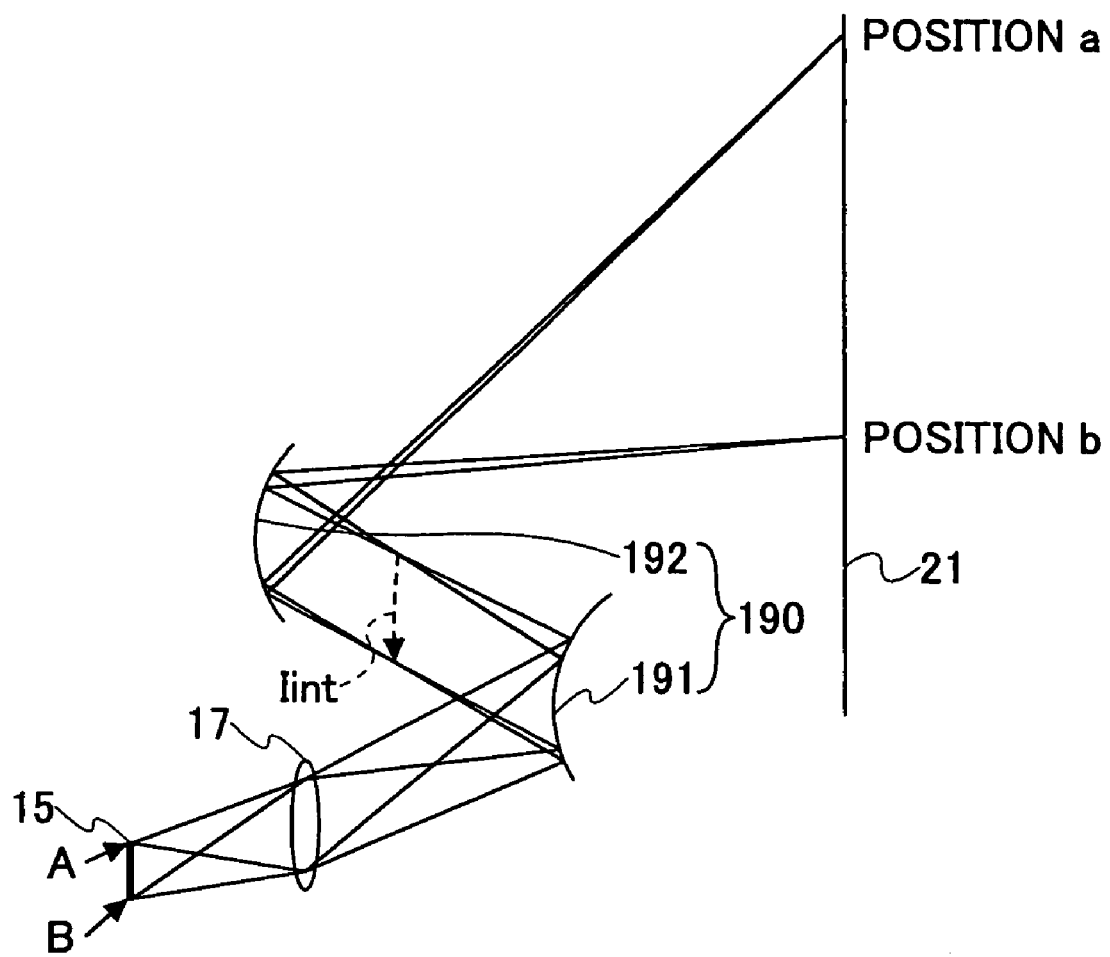
FIG. 5 is a diagram for illustrating a projection optical system according to an embodiment of the present invention.

FIG. 5 is a diagram showing an embodiment according to the present invention. In FIG. 5, the same elements as those of FIG. 1 are referred to by the same numerals.

In the embodiment of FIG. 5, a second optical system 190 includes a reflecting surface 192 having positive power and a reflecting surface 191 having negative power.

Each light beam from the panel 15 becomes an imaging light beam by the action of the first optical system 17. Before forming the intermediate image $I_{int}$, each light beam is made incident on the negative-power reflecting surface 191 to be reflected toward the reflecting surface 192. The intermediate image $I_{int}$ is formed between the reflecting surfaces 191 and 192. The intermediate image $I_{int}$ is further magnified by the positive power of the reflecting surface 192 so that an image on the panel 15 is projected onto the screen 21.

That is, the reflecting surface 191 of the second optical system 190 is an example of the above-described negative-power optical element having the effect of bringing the position where the intermediate image $I_{int}$ is formed close to the positive-power reflecting surface 192 of the second optical element 190.

As the reflecting surface 191, a reflecting optical element having divergent power, such as a convex reflecting surface, a Fresnel convex reflecting mirror, or a hologram reflecting mirror having positive power, may be suitably employed.

The projection optical system slightly increases in size to move the position of the intermediate image $I_{int}$ away from the light valve 15. However, by forming the above-described negative-power optical element of a reflecting mirror, it is possible to employ a layout folding back an optical path, thereby reducing the size of the entire optical system.

By employing the above-described negative-power optical element for bringing the position where the intermediate image $I_{int}$ is formed close to the positive-power reflecting surface of the second optical system, it is possible to perform such control as to narrow the degree of divergence of a light beam incident on the positive-power reflecting surface of the second optical system. As a result, the effective reflecting region of the positive-power reflecting surface can be reduced.

Light collection characteristics and distortion can be controlled more finely by controlling the effective reflecting region of the positive-power reflecting surface and providing a local figure to the figure of the reflecting surface, that is, setting a free-form surface figure.

The employment of the above-described configuration makes it possible to widen an angle compared with the conventional projection optical system.

Forming at least one of the above-described reflecting surfaces of a free-form surface provides more design latitude, thus making it easy to correct aberrations.

The free-form surface is a surface including a non-rotationally symmetric surface figure, such as an anamorphic surface or an X-Y polynomial surface.

In design, a desirable image formation characteristic can be realized by forming each of the (refracting and reflecting) surfaces included in the projection optical system of a free-form surface. Actually, however, this requires stricter accuracy in the relative positional error and the decentering error of each surface. Accordingly, it is not necessarily that the larger the number of free-form surfaces, the better. Rather, it is preferable to set an optimum number of free-form surfaces.

As described above, each light beam that has formed the intermediate image $I_{int}$ becomes a divergent light beam thereafter to be made incident on the positive-power reflecting surface (concave mirror) of the second optical system. Accordingly, a divergent light beam from each position of the intermediate image $I_{int}$ is reflected from a local reflecting region on the concave mirror to be focused onto the screen. In other words, a light beam focused onto each position on the screen corresponds to a local reflecting region for each image height on the concave mirror.

Thus, the surface figure of the concave mirror (a reflecting surface from which a light beam forming the intermediate image is reflected first after the formation of the intermediate image) may be a free-form surface so that the curved surface figure of the reflecting surface may be controlled with respect to a reflecting region for each image height. As a result, aberrations can be corrected most effectively, and the performance can be improved.

The smaller the number of free-form surfaces, the better, considering surface processing and assembly. It is most effective to apply a free-form surface preferentially to the positive-power reflecting surface (concave mirror) immediately after the position where the intermediate image is formed. It is possible to design so as to increase light collection characteristics and an image distortion characteristic by setting the figure of a free-form surface that can control a local figure of a concave surface having light collection (condensing) power as well as controlling a reflecting region.

The intermediate image may be a one to several times magnified image. A high imaging magnification is unnecessary for the first optical system relating to the formation of the intermediate image. Accordingly, it is possible to optimize the first optical system by the conventional configuration of only a dioptric system. Forming the first optical system by only a dioptric system makes it easy to optically design the first optical system, and makes it possible to relax tolerance for surface processing and assembly.

Further, it is also possible to increase design latitude by increasing the number of refracting surfaces and distribute tolerance, thereby improving performance.

The first optical system may be formed of only a dioptric system. However, if a further improvement in performance is desired, the latitude in the configuration of the first optical system may be further increased.

In the case of pursuing such a further improvement in performance, the first optical system may be formed of a reflecting surface having a rotational symmetry axis and a dioptric system. The reflecting surface having a rotational symmetry axis can be formed relatively easily, and is extremely effective in increasing design latitude without losing processability and assemblability. A further increase in latitude may be achieved by providing an aspheric surface figure to the reflecting surface having a rotational symmetry axis. Further, providing latitude of shift or decentration to the reflecting surface makes it possible to design with increased latitude.

The dioptric system may also employ an aspheric surface figure. The employment of this configuration increases latitude in design, thus making it possible to realize a projection optical system with higher performance.

The reflecting surface may be processed by any of conventionally known various processing methods such as grinding, molding using a metal mold, and accurate shape transfer processing. Further, a refracting and transmitting surface and a reflecting surface may be integrated so as to have a total internal reflection structure.

Referring back to FIG. 1, a further description is given of the image projection apparatus.

As the lamp of the light emitting part 11 of the light source 10, a halogen lamp, a xenon lamp, a metal halide lamp, or a super-high pressure mercury lamp may be employed.

The reflector integrated with the lamp to be provided in the vicinity thereof is employed to obtain high illumination efficiency. Although not shown in FIG. 1, a well known illuminance uniforming part referred to as an integrator optical system may be employed to project a light beam reflected from the reflector to have directivity onto the panel 15 with uniform light intensity so that the surface of the panel 15 is illuminated with an even illumination distribution.

In the case of replacing the transmission liquid crystal panel employed as the panel 15 with a reflection liquid crystal light valve, efficient illumination can be performed by splitting an illumination optical path and a projection optical path using a polarization beam splitter.

Further, in the case of employing a Digital Micromirror Device (DMD) as a light valve, an optical path splitting optical system using an oblique incidence optical system or a total reflection prism may be employed. Thus, a suitable optical system may be employed in accordance with a light valve type.

In a front-type projector, it is desirable that a projected image be shifted upward so as not to be hidden behind the projector when viewed from a viewer. That is, the light valve 15 is shifted (downward in FIG. 1) in a plane perpendicular to the optical axis of the projection optical system (the optical axis of the first optical system 17) so that light beams are made incident on the projection optical system from its lower side.

As the shift of the light valve 15 increases, particularly, an effective angle of view should be widened as a specification required for the first optical system 17. The shift of the light valve 15 is set to a suitable size. The intermediate image $I_{int}$ is formed temporarily by the first optical system 17. The image formed by the light valve 15 is magnified and projected onto the screen 21 by the positive-power second optical system 19.

In the case of a projector of a rear projection type, space occupancy can be lowered by folding an optical path by providing a plane mirror in a projection optical path.

In the above-described embodiment, only the single panel 15 is shown for simplification. Alternatively, three panels for red, green, and blue may be employed. Light beams modulated by the three panels may be subjected to color composite by a well known color composite part such as a dichroic prism, and thereafter, be made incident on the first optical system 17. Thereby, a color image can be projected onto the screen 21.

The projection optical system according to this embodiment includes the first optical system 17 and the second optical system (for instance, the second optical system 19). The image formed by the light valve 15 is formed as an intermediate image in the optical path of the first and second optical systems 17 and 19, and the intermediate image is further magnified and projected. Accordingly, high projection magnification can be realized. Since the first optical system 17 includes a dioptric system, chromatic aberration is correctable using the chromatic dispersion characteristic even in the case of employing a color composite prism. Further, since the optical path of imaging light beams is folded back by a reflecting surface of the second optical system 19, the projection optical system can be made compact.

Accordingly, the image projection apparatus according to this embodiment, including this projection optical system, can be made compact with a long optical path of image light beams being provided in a space in the apparatus. As a result, a large-size image can be projected and displayed with a reduced projection space outside the apparatus.

Next, a description is given of another embodiment according to the present invention.

Figure 6:
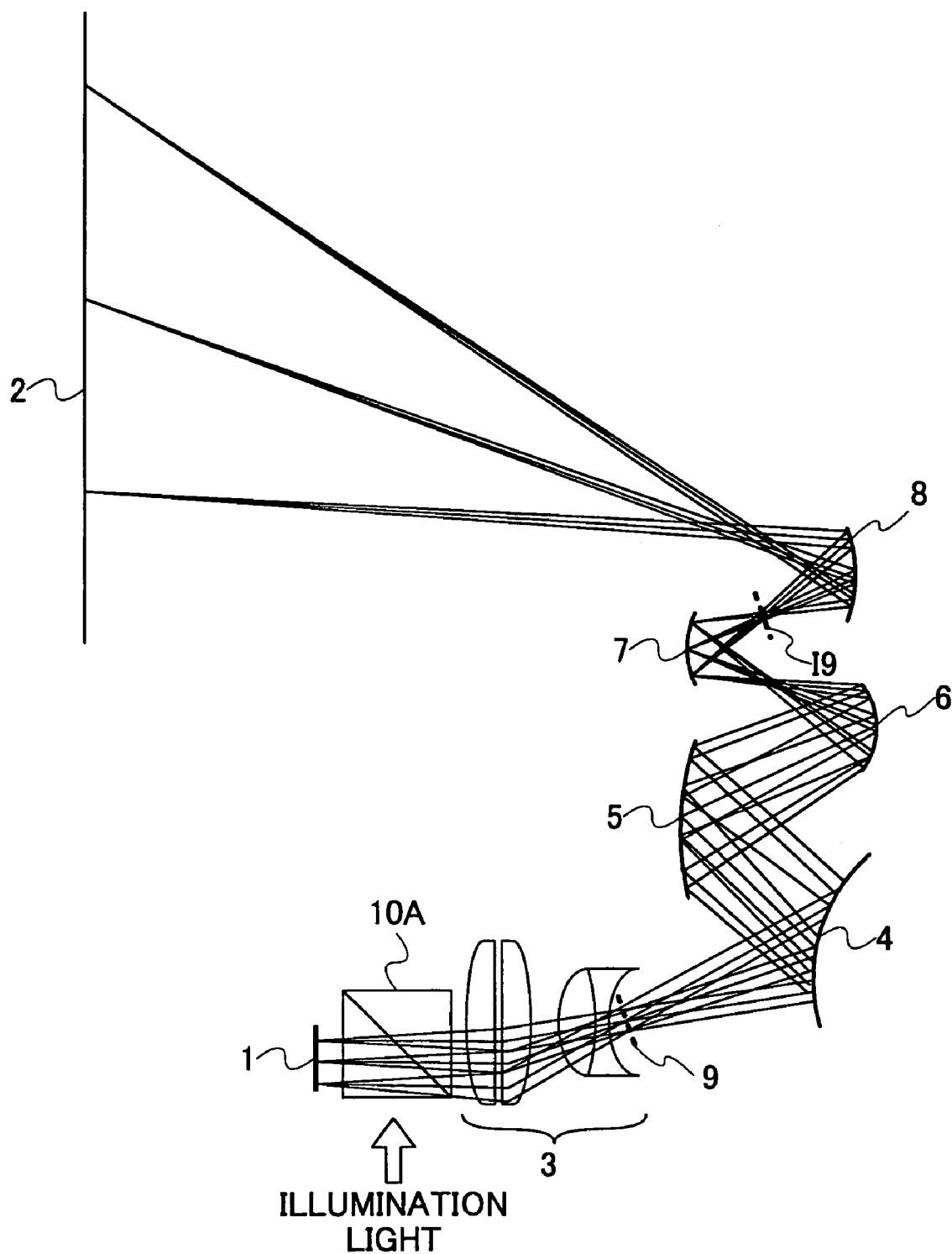
FIG. 6 is a diagram for illustrating a magnification projection optical system according to an embodiment of the present invention.

Referring to FIG. 6, the reference ray of a group of light beams traveling from an image display panel 1 (hereinafter referred to simply as a panel 1) toward a screen 2 is made incident thereon at a predetermined angle to the normal (perpendicular) of the screen 2. The reference ray is the principal ray of a light beam guided from the center of the panel 1 to the screen 2. The reference ray is the principal ray of a light beam guided from the center of the panel 1 to the screen 2.

The panel 1 is a reflection liquid crystal panel, and is illuminated with linearly polarized illumination light via a polarization beam splitter 1A. Light beams modulated by the panel 1 become imaging light beams through the polarization beam splitter 10A. The image display panel may be a lightbulb such as a transmission or reflection liquid crystal panel or a DMD.

In light transmission, the panel 1 side may be referred to as the upstream side and the screen 2 side may be referred to as the downstream side. A transmission optical system 3 that includes a transmitting surface having refractive power and at least one aspheric surface is provided on the downstream side of the panel 1. A reflection optical system including a plurality of reflecting surfaces 4 through 8 is provided on the downstream side of the transmission optical system 3.

The imaging light beams from the panel 1 are transmitted inside the transmission optical system 3 to be guided to the screen 2 via the reflecting surfaces 4 through 8 forming the reflection optical system. Of the reflecting surfaces 4 through 8 forming the reflection optical system, the reflecting surface 8 is a rotationally asymmetric reflecting surface.

It is desirable to provide the transmission optical system 3 with light beam condensing action. In this embodiment, a magnification effect load-is reduced in the transmission optical system 3 so as to prevent particularly the aperture of a lens on the downstream side from becoming larger in size. Accordingly, the entire or a substantial portion of the magnification effect as a magnification projection optical system is assumed by the reflection optical system.

Asymmetric aberration (aberration resulting from the vertical asymmetry of the reference axis in FIG. 6) is corrected by the rotationally asymmetric reflecting surface 8, and the optical axis of the transmission optical system 3 is set to be decentered with respect to the panel 1 (in this embodiment, the optical axis is eccentric in the upward direction of FIG. 6 with respect to the center of the panel 1). As a result, the effect of the correction of asymmetric aberration is increased. That is, the correction of asymmetric aberration is assumed by both the transmission optical system 3 and the reflection optical system.

The entire transmission optical system 3 is assembled coaxially so as to be formed into a cell easily.

In the case of forming a magnification projection optical system of a transmission optical system and a reflection optical system as in this embodiment, it is easy to assemble the optical system compared with the case of forming all optical surfaces of reflecting surfaces. Further, it is also possible to utilize the "optical path folding-back effect" so that the entire system can be reduced in size.

A diaphragm 9 is provided on the upstream side of the reflecting surface 4 on the downstream side of the transmission optical system 3. An image I9 of the diaphragm 9 is formed with negative reducing magnification in an imaging optical path by the reflecting surfaces 4 through 7 on the downstream side of the diaphragm 9. That is, the image I9 of reducing magnification of the diaphragm 9 is formed as an inverted image between the reflecting surface 7 and the rotationally asymmetric reflecting surface 8 by the action of the reflecting surfaces 4 through 7 of the reflection optical system.

By thus providing a power arrangement such that the image I9 of the diaphragm 9 is formed with reducing magnification, a light beam made incident on a reflecting surface on the downstream side of the image I9 of the diaphragm 9 (the reflecting surface 8 in this embodiment) is prevented from widening greatly. That is, the effective aperture of the reflecting surface can be reduced. As a result, this reflecting surface can be reduced in size.

As described above, the image I9 of the diaphragm 9 is formed within the optical path of the reflection optical system (between the reflecting surface 7 and the rotationally asymmetric reflecting surface 8). The position where the image I9 is formed is a screen (downstream)-side pupil, that is, the exit pupil of the magnification projection optical system.

The imaging light beams form the intermediate image of the panel 1 in the optical path inside the reflection optical system. Like the image 19 of the diaphragm 9, the intermediate image is a real image of negative magnification and an inverted image. In the embodiment of FIG. 6, the intermediate image of the panel 1 is formed in the vicinity of the reflecting surface 7. That is, the intermediate image of the panel 1 is formed by the transmission optical system 3 and the reflecting surfaces 4 through 6.

It is a magnified image of the intermediate image of the panel 1 by the reflecting surface 7 and the rotationally asymmetric reflecting surface 8 that is formed on the screen 2. The imaging magnification at this time is also negative. Thus, the light beams from the panel 1 form the intermediate image as an inverted image, and the inverted image is inversed to be imaged on the screen 2 as an erect image. At this point, trapezoidal distortion generated in the intermediate image offsets trapezoidal distortion at the time of forming the image on the screen 2. As a result, the image can be displayed with reduced trapezoidal distortion.

In the case of forming the transmission optical system 3 into a cell as a single unit, the relative positional adjustment between the transmission optical system 3 formed into the cell and the reflection optical system remains as positional adjustment in the magnification projection optical system. At this point, the reflecting surface 4 provided furthest on the upstream side in the reflection optical system may have positive power. In this case, if the light beams emitted from the transmission optical system 3 are condensing light beams, the light beams are further condensed by the positive power of the reflecting surface 4.

In this embodiment, the power of the reflecting surface 4 is negative. If the reflecting surface 4 has positive power, a greater aberration is generated when the relative positions of the transmission optical system 3 and the reflection optical system are offset. In other words, if the reflecting surface 4 has positive power, a variation in aberration is greater with respect to the same offset between the transmission optical system 3 and the reflection optical system.

In the case of providing the reflecting surface with negative power as in this embodiment, a variation in aberration with respect to the offset is small. Accordingly, the accuracy of the relative positional relationship between the transmission optical system 3 and the reflection optical system is relaxed, thus facilitating the assembling of the optical system.

To simplify integrating the transmission optical system 3 and the reflection optical system, the transmission optical system 3 and the reflection optical system may be assembled separately. At this point, the assembling of each of the transmission optical system 3 and the reflection optical system may be accompanied by assembly error. Accordingly, it is difficult to totally eliminate the relative positional offset between the transmission optical system 3 and the reflection optical system. Given the occurrence of a relative positional offset, it is preferable, in terms of tolerance sensitivity, that the reflecting surface 4 having power be a negative-power reflecting surface.

The light beam emitted from the transmission optical system 3 is rarely divergent, and normally, is convergent. At this point, if the reflecting surface 4 has positive power, the light beam is further converged. On the other hand, if the reflecting surface 4 has negative power, the convergence of the light beam is relaxed. Comparing these two cases, a variation in the state of the light beam due to the relative positional offset between the transmission optical system 3 and the reflection optical system is greater in the former case, thus imposing stricter assembly tolerance. By providing negative power to the reflecting surface 4, assembly tolerance can be eased.

The reflecting surface 4 is provided with negative power, and the reflecting surface 5, positioned on the downstream side of the reflecting surface 4, is provided with positive power. A succession of negative-power reflecting surfaces on the upstream side in the reflection optical system causes incident light beams to be overly divergent, thus preventing the diaphragm image from being formed in the reflection optical system.

It is preferred to provide the reflecting surface 5 with positive power in order to provide a tendency to converge to the imaging light beams reflected from the reflecting surface 5 so that the image I9 of the diaphragm 9 is formed in the optical path of the reflection optical system. That is, the composite power of the optical system (reflecting surfaces 4 through 7) provided between the diaphragm 9 and the image I9 thereof is positive. Providing positive power to the reflecting surface 5 makes it possible to prevent the separation of light beams of different angles of view and reduce the size of the reflecting surface receiving the light beams.

It is also possible to provide the reflecting surface 5 as well as the reflecting surface 4 with negative power and the reflecting surface 6 on the downstream side of the reflecting surface 5 with positive power. In this case, however, it may be necessary to increase the power of the reflecting surface 6. Further, an inter-surface distance may be enlarged to increase aberration to be generated, enlarge the optical system, and thus increase the number of surfaces forming the optical system, which case begins to lose merit.

According to the present invention, in the magnification projection optical system where each of the panel 1 and the screen 2 is a plane surface and "oblique projection" is performed, optical systems are formed on the upstream side and the downstream side, respectively, of an intermediate image plane so that the position and the shape of the negative-magnification intermediate image of the panel 1 generated by light beams traveling from the panel 1 side toward the screen 2 (the intermediate image of the panel 1 generated in the optical path of an imaging light beam by the magnification projection optical system) are substantially identical to those of the negative-magnification intermediate image of the screen 2 generated by light beams traveling from the screen 2 side toward the panel 1. Thereby, the sum of the distortion generated between the panel 1 and the intermediate image and the distortion generated between the intermediate image and the screen 2 can be approximated to zero. Accordingly, it is possible to form an image on the screen 2 with reduced distortion.

The light beams traveling from the screen 2 side toward the panel 1 are imaginary light beams used in performing ray tracing with the screen 2 being an object surface and the panel 1 being an image surface in designing the magnification projection optical system. In this case, the intermediate image of the screen 2 in the optical path is formed as a reduced image on the panel 1.

It is preferable that the rotationally asymmetric reflecting surface 8 be positioned closest to the screen 2, provided furthest on the downstream side, in the optical path of the imaging light beams in the reflection optical system as in this embodiment. The reflecting surfaces 4 through 8 are provided so that the overlap area of the incident positions of the light beams corresponding to different angles of view increases toward the upstream direction and decreases toward the downstream direction.

On a rotationally asymmetric reflecting surface, a figure is formable with high latitude with respect to an incident position. Accordingly, by positioning the rotationally asymmetric reflecting surface 8 furthest on the downstream side and reducing the overlap area of the light beams corresponding to different angles of view at this surface position, the rotationally asymmetric reflecting surface 8 can be provided with a figure suitable for the correction of the residual aberration of the light beams of the angles of view generated by the optical system on the upstream side of the rotationally asymmetric reflecting surface 8. Thereby, highly effective aberration correction can be realized. That is, the residual aberration of the light beams of respective image height positions reaching the last reflecting surface 8 can be corrected easily by providing the reflecting surface 8 with suitable figures for the respective incidence positions of the light beams.

If a rotationally asymmetric reflecting surface is provided on the upstream side of the reflection optical system, light beams of different angles of view are incident on the same position on the reflecting surface, overlapping with each other. Accordingly, it is difficult to obtain a figure solution that simultaneously corrects the aberrations of the light beams of the different angles of view.

According to this embodiment, the transmission optical system 3 may also take partial charge of the correction of an asymmetric aberration component. In this case, the transmission optical system 3 is provided with a rotationally asymmetric transmitting surface in order to increase the effect of the correction. A rotationally asymmetric surface is effective in correcting an aberration component that is difficult for a rotationally symmetric aspheric surface to correct. That is, the rotationally asymmetric transmitting surface can generate aberration that cannot be generated by a rotationally symmetric transmitting surface. The aberration thus generated can be used to cancel other aberration.

The reflecting surfaces 4 through 8, forming the reflection optical system, may be formed integrally with one another as a unit. This makes it easy to provide accuracy to the relative positions of the reflecting surfaces 4 through 8 and assemble the magnification projection optical system. The reflecting surfaces 4 through 8 may be integrated by, for instance, molding. The reflecting surfaces 4 through 8 may also be integrated by another suitable method, as will be appreciated.

The position of, the diaphragm 9 is not limited to the position of FIG. 6. The diaphragm 9 may be provided between surfaces in the transmission optical system 3, for instance. In this case, part of the transmission optical system 3 contributes to the formation of the image I9 of the diaphragm 9.

The number of image display panels is not limited to one. Three image display panels may be employed so that images of R (red), G (green), B (blue) color components may be displayed on the different image display panels corresponding to their respective colors. Light beams from the image display panels may be composed to be guided to a screen by the magnification projection optical system so that a color image is displayed on the screen.

In this case, a combination of a polarization beam splitter and a dichroic prism (well known in color image projection apparatuses) may be used between the panel 1 and the transmission optical system 3 in FIG. 6.

Further, the screen is not necessarily a plane surface.

As described above, according to the magnification projection optical system of FIG. 6, the light beams from the panel 1 are guided to the screen 2 and projected thereonto from a direction inclined to the normal of the screen 2 so that a magnified version of an image displayed on the panel 1 is formed on the screen 2. The magnification projection optical system includes the reflection optical system and the transmission optical system 3. The reflection optical system is formed of the reflecting surfaces 4 through 8 having power. The reflecting surface 8 is a rotationally asymmetric reflecting surface. The transmission optical system 3 includes a transmitting surface having refractive power and at least one aspheric surface. The transmission optical system 3 may include a Fresnel lens surface. The reflection optical system may be configured so that light reflection on the reflecting surfaces of the reflection optical system satisfies an internal total reflection condition. In the case of the reflecting surfaces being internal total reflection surfaces, the surface that captures a light beam from the transmission optical system is a transmission surface. In this case, it is preferable that the incident light beam be perpendicular to the transmitting surface because this prevents aberration from occurring at the time of the incidence.

According to the above-described magnification projection optical system, the (imaging) light beams from the panel 1 are projected onto the screen 2 from a direction inclined to the normal of the screen 2 so as to form a magnified image on the screen 2. This effectively reduces distortion that occurs when imaging light beams projected from the direction of the normal of the screen 2 are inclined thereto.

The transmitting surface having refractive power of the transmission optical system 3 may be realized easily by a lens system, and may also be formed into a cell easily. Therefore, it is easy to provide assembly accuracy, thus producing the effect of cost reduction.

According to the above-described magnification projection optical system, an asymmetric aberration component is correctable by the rotationally asymmetric reflecting surface 8.

If the magnification projection optical system is composed of only refracting surfaces, the array of the reflecting surfaces extends in one direction. Therefore, it is impossible to reduce the size of the three-dimensional structure of the optical system. However, by combining a transmitting surface and a reflecting surface, the optical path can be folded so that the optical system can be reduced in size.

For instance, by providing the optical path of a transmission optical system parallel to a screen, and folding the optical path to the screen side on the image side of the transmission optical system, the optical system can be reduced in thickness while maintaining the same optical path length.

The diaphragm 9 is provided between the first surface of the transmission optical system 3 from its image display panel side and the first surface of the reflection optical system from its screen side. The image I9 of the diaphragm 9 is formed with negative reducing magnification by the reflecting surfaces (optical elements) 4 through 7 provided on the screen side.

Of the reflecting surfaces 4 through 8 of the reflection optical system, the reflecting surface 4, which has power and on which a light beam passing through the diaphragm 9 is made incident first, has negative power. The reflecting surface 5, subsequent to the reflecting surface 4, has positive power. Of the reflecting surfaces 4 through 8 forming the reflection optical system, the reflecting surface 8 is a rotationally asymmetric reflecting surface. The transmission optical system 3 includes a transmitting surface having refractive power and at least one aspheric surface.

According to the magnification projection apparatus of FIG. 6, the position and the shape of the intermediate image with negative magnification of the panel 1 generated by light beams traveling from the panel 1 to the screen 2 are substantially identical to those of the intermediate image with negative magnification of the screen 2 generated by light beams traveling from the screen 2 to the panel 1.

The rotationally asymmetric reflecting surface 8 is positioned at the furthest downstream end of the second optical system in the projection optical path. The transmission optical system 3 includes a rotationally asymmetric transmitting surface having refractive power. The optical axis of the transmission optical system 3 is set in a plane including a light guide path so as to be decentered with respect to the position of the panel 1. Thereby, aberration reverse to the aberration generated on a decentered reflecting surface in the reflection optical system can be generated so that it is possible to cause the aberrations to cancel each other. The light guide path is the optical path of a principal ray from the center of the panel 1 to the center of the magnified image on the screen 2 in the optical path from the panel 1 to the screen 2. Further, the reflection optical system can be formed as a unit.

Accordingly, by adding any of various well known light sources to the magnification projection optical system of FIG. 6, a magnification projection apparatus that displays an image on the panel 1, illuminates the panel 1 with light from the light source, guides a light beam from the illuminated panel 1 to the screen 2 by the magnification projection optical system, projects the light beam from a direction inclined to the normal of the screen 2, and projects a magnified version of the image displayed on the panel 1 onto the screen 2 can be realized.

Thus, the magnification projection optical system according to this embodiment can project the image on the image display panel 1 as a large screen with little distortion. Further, the magnification projection apparatus including this magnification projection optical system can be realized with a low-profile configuration.

Next, a description is given of another embodiment according to the present invention.

Figure 7:
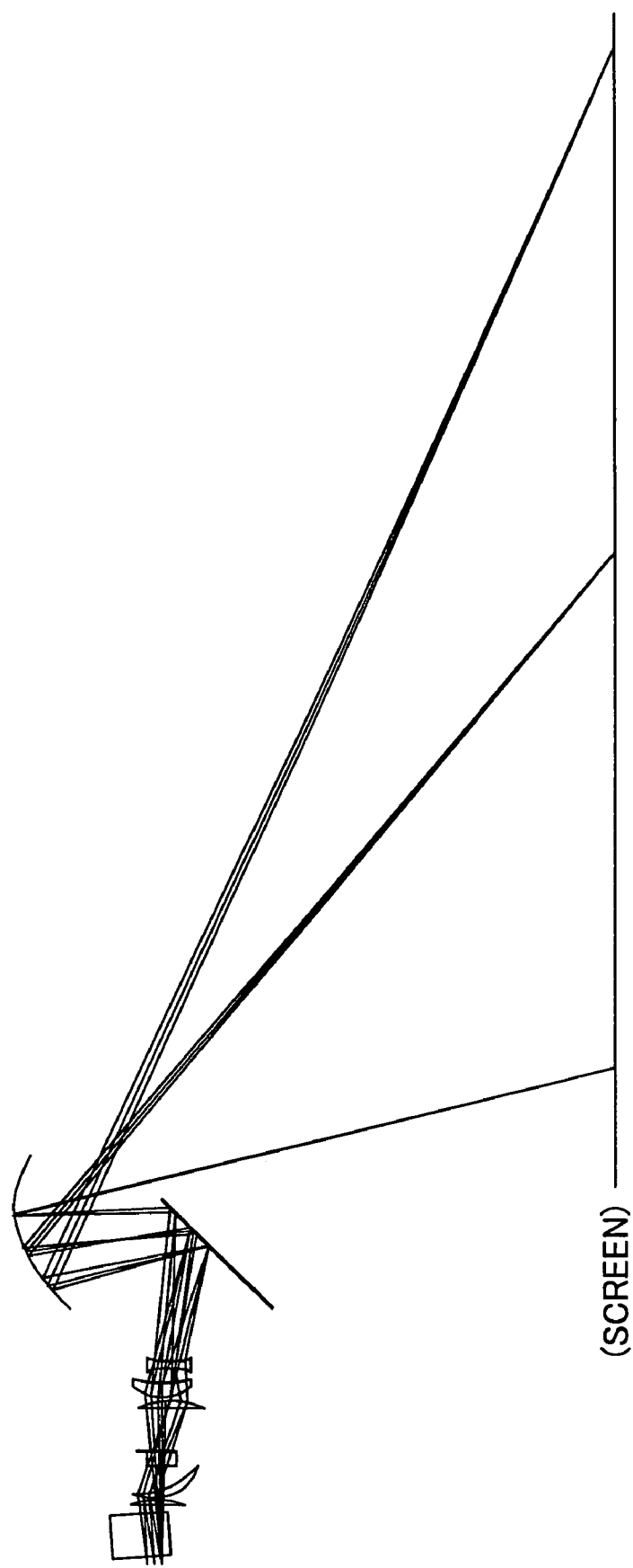
FIG. 7 is a diagram for illustrating an image projection apparatus according to an embodiment of the present invention.
Figure 8:
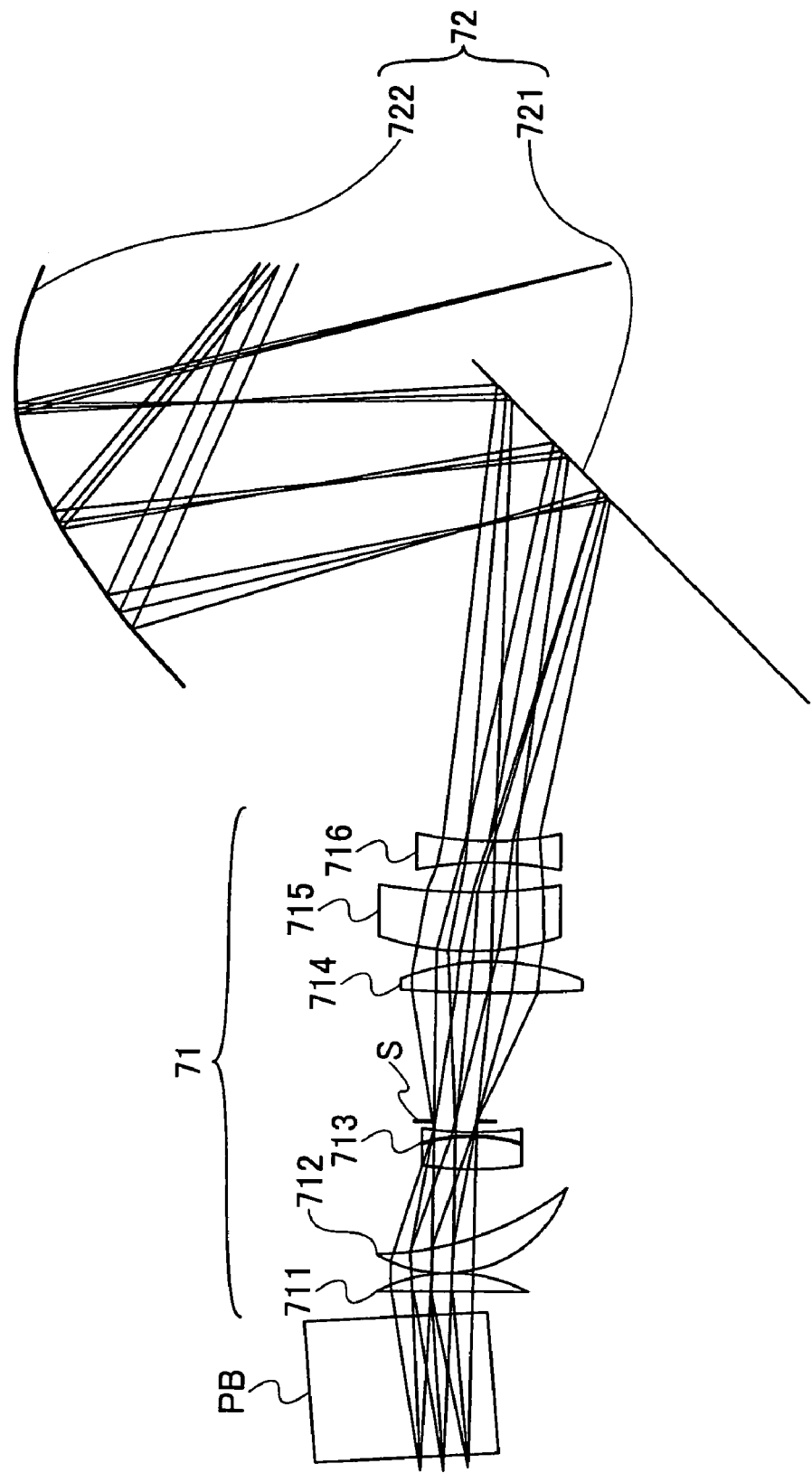
FIG. 8 is an enlarged view of a projection optical system of the image projection apparatus of FIG. 7 according to the present invention.

FIG. 7 is a diagram showing an image projection apparatus including a projection optical system according to this embodiment. FIG. 8 is an enlarged view of the projection optical system. The definition of "upstream" and "downstream" in an optical path of the above-described embodiments also applies to this and the following embodiments.

Referring to FIG. 8, the projection optical system includes a first optical system 71 provided on the object or upstream side and a second optical system 72 provided on the image or downstream side. The first optical system 71 is formed of lenses 711 through 716, and includes a diaphragm S immediately after the lens 713. The lens 713 is a doublet. The second optical system 72 includes reflecting surfaces 721 and 722.

On the object side of the first optical system 71, it is assumed, as described with reference to FIG. 6, that a reflection liquid crystal panel is illuminated with linearly polarized illumination light via a polarization beam splitter so that reflected light beams modulated by the liquid crystal panel become imaging light beams through the polarization beam splitter. Referring to FIG. 8, PB denotes the polarization beam splitter.

Light beams from the object side project an image on a projection surface (a screen in FIG. 7) via the first and second optical systems 71 and 72. The intermediate image of the object is formed between the reflecting surfaces 721 and 722, and is formed on the projection surface as a normal image by the reflecting surface 722.

As the object displaying an image to be projected, one configured to illuminate the light valve 15 with a light beam from the light emitting part 11 formed of the lamp and the reflector through the illumination optical system 12, as described with reference to FIG. 1, may be employed. Specifically, a halogen lamp, a xenon lamp, a metal halide lamp, or a super-high pressure mercury lamp is suitable as the light emitting part 11. An integrator optical system that makes the intensity of the light beam reflected from the reflector to have directivity uniform with respect to the light valve 15 may be employed as the illumination optical system 12.

As the above-described object, a type of object that performs optical path splitting with respect to a DMD panel using an oblique incidence optical system or a total reflection prism may be employed. A type of image display device illuminated with light from an external light source, such as a light valve such as a liquid crystal panel, a DMD, or a film slide, may also be employed as the above-described object. An object of a self-luminous type, such as a two-dimensional arrangement of light-emitting diodes, an LED array, an EL array, or a plasma display, may also be employed.

The projection optical system shown in FIGS. 7 and 8 includes the positive-power first optical system 71 including at least one dioptric system (such as the lens 711) and the second optical system 72 having positive power as a whole and including at least one reflecting surface having power (such as the reflecting surface 721). The first and second optical systems 71 and 72 are provided in the order described from the object surface side so that an object image is formed temporarily as an intermediate image, and thereafter, is formed as a final image. In the first optical system 71, with respect to the optical axis of the lens (optical element) 711, positioned furthest on the object side (closest to the object) and having refractive power, the other optical elements, or the lenses 712 through 716 and the reflecting surfaces 721 and 722, are shifted or tilted. That is, a shift or tilt is caused in units of optical elements. The dioptric system may include a light transmitting type element performing diffraction.

According to the projection optical system according to this embodiment, the first optical system 71 forms an intermediate image, and the second optical system 72 magnifies and projects the intermediate image, thereby increasing the (enlarging) magnification of the composition of the optical systems 71 and 72. Since the first optical system 71 includes a dioptric system, chromatic aberration is correctable using the chromatic dispersion characteristic even in the case of employing a color composite prism. Further, by causing lens elements forming the dioptric system to be shifted or tilted, reverse distortion can be generated effectively in the intermediate image so as to prevent distortion from occurring in the projected image. Accordingly, the image projection apparatus according to this embodiment can perform extremely close range projection with a desired (enlarging) magnification.

Next, a description is given of another embodiment according to the present invention.

Figure 9:
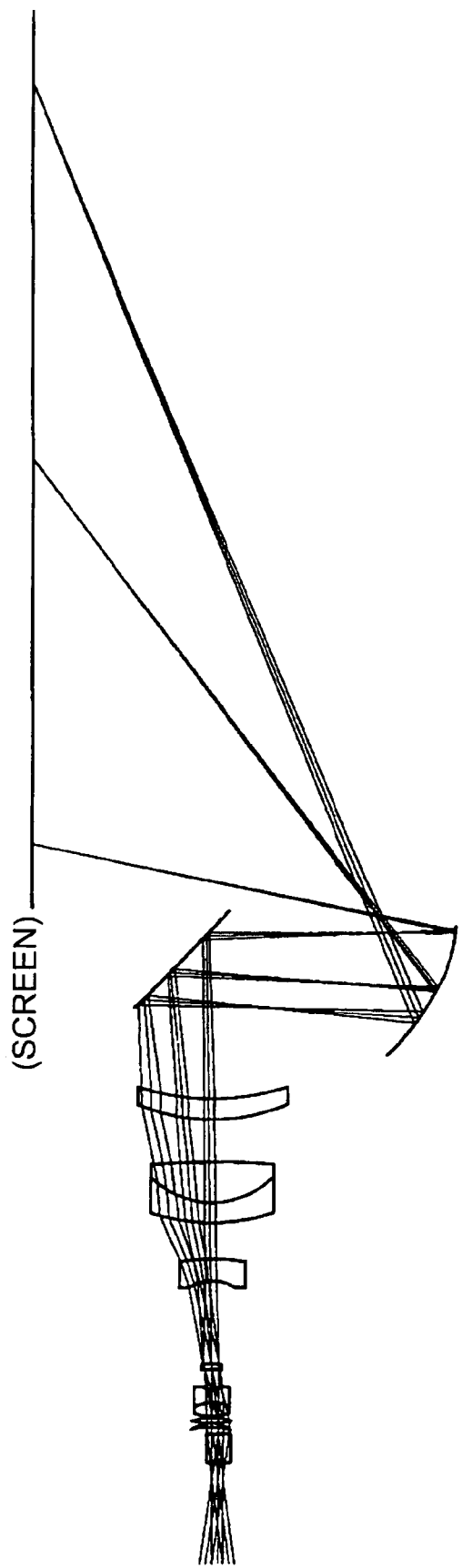
FIG. 9 is a diagram for illustrating an image projection apparatus according to an embodiment of the present invention.
Figure 10:
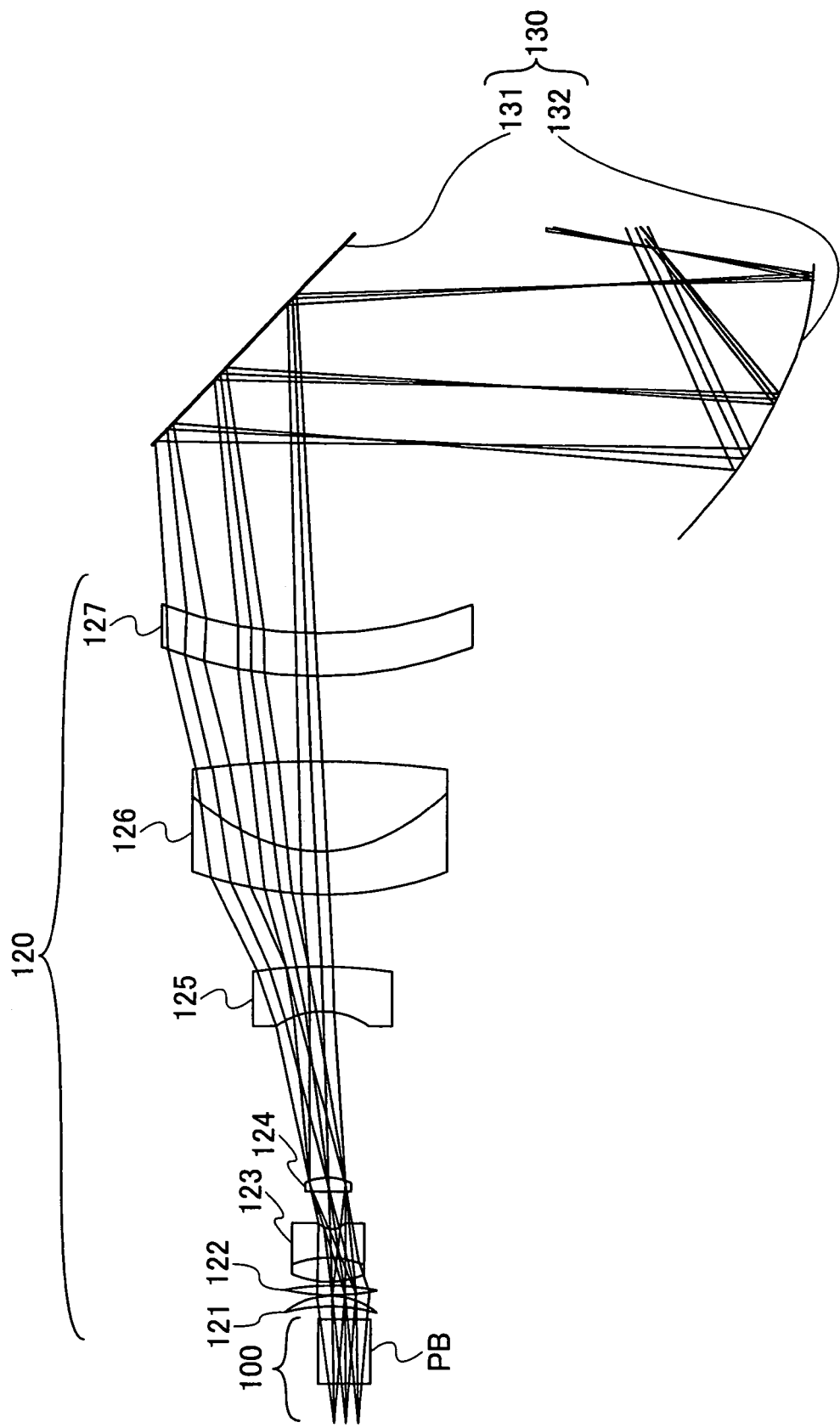
FIG. 10 is an enlarged view of a projection optical system of the image projection apparatus of FIG. 9 according to the present invention.

FIG. 9 is a diagram showing an image projection apparatus including a projection optical system according to this embodiment. FIG. 10 is an enlarged view of the projection optical system.

Referring to FIG. 10, reference numeral 100 denotes an object-side part of a type that illuminates a reflection liquid crystal panel with linearly polarized illumination light via a polarization beam splitter so that reflected light beams modulated by the liquid crystal panel become imaging light beams through the polarization beam splitter as described above with reference to FIG. 6. The image display surface of the reflection liquid crystal panel is a projected object surface (a surface on which an image to be projected is displayed as an object). In FIG. 10, PB denotes the polarization beam splitter. The object-side configuration is not limited to this. The configuration described above with reference to FIG. 1 where the light valve 15 is illuminated with a light beam from the light emitting part 11 formed of the lamp and the reflector through the illumination optical system 12 may also be employed. This configuration may include an integrator optical system. Further, a configuration that performs optical path splitting with respect to a DMD panel using an oblique incidence optical system or a total reflection prism may be employed. The projected object surface may be realized by a type of image display device illuminated with light from an external light source, such as a light valve such as a liquid crystal panel, a DMD, or a film slide. Alternatively, an object of a self-luminous type, such as a two-dimensional array of light emitting diodes, an LED array, an EL array, or a plasma display, may also be employed.

The projection optical system of FIG. 10 includes a transmission dioptric system 120 and a reflection dioptric system 130.

The transmission dioptric system 120 includes lenses 121 through 127. The lenses 123 and 126 are doublets. In the illustrated exemplary embodiment, the transmission dioptric system 120 is formed of nine lenses. The reflection dioptric system 130 includes a first reflecting mirror 131 and a second reflecting mirror 132. The first and second reflecting mirrors 131 and 132 are arranged in the order described from upstream to downstream on the downstream side of the transmission dioptric system 120. FIG. 10 shows only the reflecting surfaces of the reflecting mirrors 131 and 132. The reflecting mirrors 131 and 132 are general optical elements performing reflection and refraction of light at the interface of reflection. Alternatively, the reflecting mirrors 131 and 132 may be light reflecting optical elements performing diffraction.

That is, according to the projection optical system shown in FIGS. 9 and 10, light beams from the projected object surface are guided by the transmission dioptric system 120 and the reflection dioptric system 130 to be projected onto a projection surface (a screen shown in FIG. 9).

The transmission dioptric system 120 includes the lenses (transmission refractive elements) 121 through 127. It is substantially telecentric from the projected object surface up to the first surface (the object-side surface of the lens 121) of the transmission dioptric system 120 as shown in FIG. 10. The intermediate image surface of the projected object surface is positioned between the reflecting mirrors 131 and 132 of the reflection dioptric system 130. An intermediate image on the intermediate image surface is re-formed as a final image on the projection surface via the second reflecting mirror 132. The transmission refractive element means a general optical element performing refraction of light at the interface of a light transmitting medium, and is typically a lens. Alternatively, the transmission refractive element may be a light transmitting element performing diffraction.

As shown in Embodiment 6 described below, the first reflecting mirror 131 has negative-power and is axially symmetric, and the second reflecting mirror 132 is an anamorphic polynomial free-form surface whose vertical power and lateral power are different. A light beam from the second reflecting mirror 132 is guided to the projection surface at an angle to the normal of the projection surface.

The transmission dioptric system 120 is decentered with respect to the normal of the projected object surface. The transmission refractive elements 121 through 127 of the transmission dioptric system 120, however, are not decentered with respect to one another.

The lenses 123 and 126, which are doublets, each form a lens group unit. The lenses 123 and 126 are not decentered with respect to each other at the level of a group unit.

As shown in FIG. 10, the image surface of the intermediate image formed between the reflecting mirrors 131 and 132 is tilted and curved with respect to the principal ray of a light beam emitted from the center of the projected image surface. This increases latitude for the intermediate image surface, thus facilitating the designing of the entire optical system. The principal ray emitted from the center of the projected image surface and a principal ray emitted from the margin of the projected image surface are substantially parallel to each other on the last surface of the transmission dioptric system 120 (the exit-side surface of the lens 127). The image projection apparatus of FIG. 9 is of a front projector type, but is convertible to a rear projection type by providing a reflecting mirror that folds an optical path in the imaging optical path.

The projection optical system according to this embodiment can project a large screen without distortion, and the image projection apparatus according to this embodiment can be formed with a low-profile configuration.

A description is given below of specific embodiments.

In optical system data, surfaces are counted successively from an object surface (a surface on which an object to be projected is displayed) as 0, 1, 2, . . . with the object surface being 0. Through the following embodiments, the first and second surfaces are the liquid crystal panel-side surface and the projection optical system-side surface, respectively, of a polarization beam splitter.

[Embodiment 1]

Embodiment 1 is a specific embodiment of the image projection apparatus and the projection optical system of FIGS. 7 and 8. That is, Embodiment 1 includes the first optical system 71 having positive power and including at least one dioptric system and the second optical system 72 including at least one reflecting surface having power and having positive power as a whole. The first and second optical systems 71 and 72 are arranged in the order described from upstream to downstream on the downstream side of the object surface. An object image is temporarily formed as an intermediate image, and thereafter, is formed as a final image. The optical elements 712 through 716, 721, and 722 are shifted or tilted with respect to the optical axis of the optical element 711 having refractive power, which is positioned at the furthest upstream end of the first optical system 71.

The magnification of the intermediate image is approximately 3×.

The data of Embodiment 1 is shown in Table 1.

TABLE 1

| Surface No. | Radius of Curvature | Surface Separation | Refractive Index | Dispersion | Shift | Tilt | Figure |
|---|---|---|---|---|---|---|---|
| 0 | ∞ | 5.0 | | | | | |
| 1 | ∞ | 34.30 | 1.516798 | 64.1983 | | | |
| 2 | ∞ | 5.00 | | | | | |
| 3 | −2206.4 | 4.40 | 1.696802 | 55.4597 | −14.41 | −6.3 | Spherical |
| 4 | −45.8 | 2.30 | | | | | Spherical |
| 5 | 33.4 | 8.05 | 1.696802 | 55.4597 | −8.48 | 20.8 | Spherical |
| 6 | 69.6 | 15.54 | | | | | Spherical |
| 7 | 38.6 | 8.50 | 1.487489 | 70.4412 | −3.15 | −20.8 | Spherical |
| 8 | −54.1 | 0.55 | 1.846663 | 23.7848 | | | Spherical |
| 9 | 29.0 | 1.33 | | | | | Spherical |
| 10 Diaphragm | ∞ | 35.74 | | | | | |
| 11 | 130.8 | 7.90 | 1.834001 | 37.3451 | 2.29 | | Spherical |
| 12 | −72.5 | 2.00 | | | | | Spherical |
| 13 | 56.0 | 14.70 | 1.743299 | 49.2216 | 4.51 | | Spherical |
| 14 | 265.1 | 8.10 | | | | | Spherical |
| 15 | −69.5 | 2.50 | 1.487489 | 70.4412 | −4.65 | | Spherical |
| 16 | 44.2 | 80.00 | | | | | Spherical |
| 17 | 3000.0 | −150.00 | | | −36.50 | −45 | Spherical |
| 18 | | | | | 10.00 | 25 | Polynomial Free-Form Surface |

In Table 1, "Shift" means the amount of shift, and "Tilt" means the amount of tilt. The units of "Radius of Curvature," "Surface Separation," and "Shift" are "mm," and the unit of "Tilt" is "degree." The same applies to the following embodiments.

The reflecting surface of the second reflecting mirror 722, which is the 18$^{th}$ surface, is an anamorphic polynomial free-form surface having different vertical and lateral powers. The figure of the anamorphic polynomial free-form surface having different vertical lateral powers is expressed by:

$$Z = X2 \cdot x^2 + Y2 \cdot y^2 + X2Y \cdot x^2 y + Y3 \cdot y^3 + X4 \cdot x^4 + X2Y2 \cdot x^2 y^2 +$$
$$Y4 \cdot y^4 + X4Y \cdot x^4 y + X3Y2 \cdot x^3 y^2 + Y5 \cdot y^5 + X6 \cdot x^6 +$$
$$X4Y2 \cdot x^4 y^2 + X2Y4 \cdot x^2 y^4 + Y6 \cdot y^6 + \cdots$$

where X2, Y2, X2Y, Y3, X2Y2, etc. are coefficients, letting the vertical directions be the Y directions, the lateral directions be the X directions, and the depth of the curved surface be the Z directions. The vertical (upward and downward) directions and the lateral (rightward and leftward) directions are considered based on the projected image. The coefficients of the polynomial free-form surface are shown in Table 2.

TABLE 2

| Coefficient | Coefficient Value |
|---|---|
| X2 | 6.99519E−03 |
| Y2 | 5.16104E−03 |
| X2Y | 6.00372E−05 |
| Y3 | 4.11672E−05 |
| X4 | −1.12766E−07 |
| X2Y2 | 4.40932E−07 |
| Y4 | 3.71145E−07 |
| X4Y | −3.32774E−09 |
| X3Y2 | 1.09835E−09 |
| Y5 | 2.32182E−09 |
| X6 | 1.30492E−11 |

TABLE 2-continued

| Coefficient | Coefficient Value |
|---|---|
| X4Y2 | −4.80572E−11 |
| X2Y4 | −1.76822E−11 |
| Y6 | 1.14641E−11 |

In Table 2, "1.14641E-11," for instance, means "1.14641× 10$^{-11}$." The same applies to the following embodiments.

As described above, the first optical system 71 is composed of seven lenses, and the second optical system 72 is formed of two reflecting surfaces. The reflecting surface 721 is spherical, and the reflecting surface 722 is a polynomial free-form surface.

The image surface (screen) of the final image is a plane surface parallel to the rightward and leftward directions of FIG. 7. There is a great difference in angle of incidence to the screen between a lower position (closer to the object) and a higher position (remoter from the object) of the image height. Therefore, the projected image tends to be narrowed downward and distorted. In this embodiment, distortion on the final image surface is corrected by inversely setting the distortion of the intermediate image.

Figure 11:
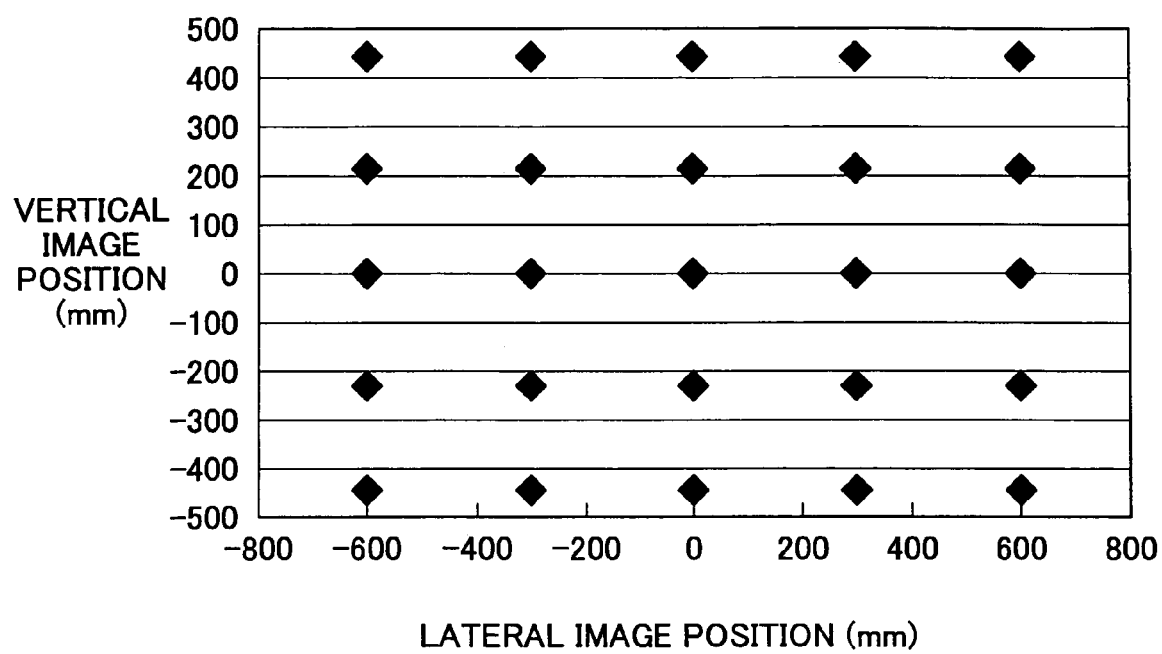
FIG. 11 is a diagram showing the state of image distortion on a screen according to an embodiment of the present invention.

FIG. 11 shows the state of image distortion on the final image surface. FIG. 11 shows the state of image distortion when an image displayed on a liquid crystal panel of approximately 0.9 inch diagonal in size is magnified to approximately 60 inches and projected. As shown in FIG. 11, grid images can be formed at approximately equal intervals, and trapezoidal distortion may be suitably corrected. Projection size is 1200×900 mm, magnification is 65× or higher, and distortion is 0.5% or lower, which values are desirable.

[Embodiment 2]

Figure 12:
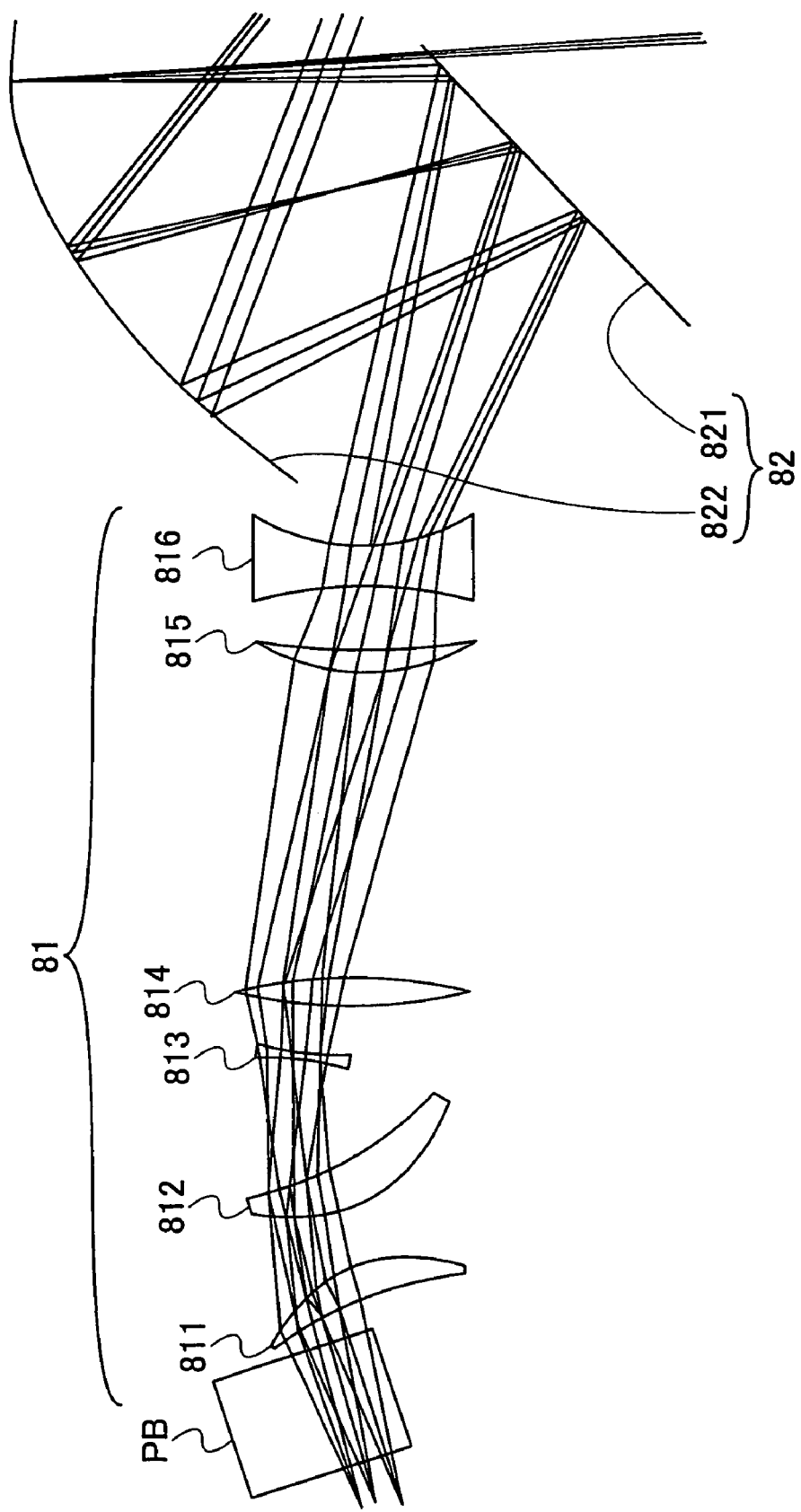
FIG. 12 is a diagram for illustrating an image projection apparatus according to an embodiment of the present invention.

Embodiment 2 is a specific embodiment of an image projection apparatus and a projection optical system shown in FIG. 12. In FIG. 12, the projection optical system of the image projection apparatus is shown enlarged.

The projection optical system includes a first optical system 81 and a second optical system 82. The first optical system 81 is composed of six lenses 811 through 816. The second optical system 82 is composed of two reflecting surfaces 821 and 822. A diaphragm (not graphically represented) is provided between the lenses 813 and 814.

Like in Embodiment 1, an intermediate image is formed as an inverted image by the first optical system 81 between the reflecting surfaces 821 and 822. The reflecting surface 821, which has positive power and reflects a light beam made incident on the second optical system 82 first, has a rotationally symmetric aspheric figure. The reflecting surface 822 is a polynomial free-form surface. In Embodiment 2, the employment of a rotationally symmetric aspheric figure makes it possible to design with higher latitude.

The data of Embodiment 2 is shown in Table 3.

TABLE 3

| Surface No. | Radius of Curvature | Surface Separation | Refractive Index | Dispersion | Shift | Tilt | Figure |
|---|---|---|---|---|---|---|---|
| 0 | ∞ | 10.00 | | | | | |
| 1 | ∞ | 30.00 | 1.516798 | 64.1983 | | | |
| 2 | ∞ | 10.00 | 1 | | | | |
| 3 | −108.87 | 8.07 | 1.696802 | 55.4597 | −22.35 | 3.3 | Spherical |
| 4 | −42.82 | 17.13 | 1 | | | | Spherical |
| 5 | 46.85 | 11.00 | 1.696802 | 55.4597 | −12.67 | 9.3 | Spherical |
| 6 | 83.16 | 29.98 | 1 | | | | Spherical |
| 7 | −157.78 | 0.85 | 1.5168 | 64.1673 | −2.20 | −38.9 | Spherical |
| 8 | 44.03 | 1.44 | 1 | | | | Spherical |
| 9 Diaphragm | ∞ | 13.72 | 1 | | | | |
| 10 | 103.77 | 8.23 | 1.846663 | 37.3451 | −10.17 | | Spherical |
| 11 | −109.21 | 80.56 | 1 | | | | Spherical |
| 12 | 53.50 | 6.62 | 1.7433 | 37.3451 | −5.03 | | Spherical |
| 13 | 186.49 | 16.42 | 1 | | | | Spherical |
| 14 | −138.57 | 11.00 | 1.487489 | 70.4412 | 1.51 | | Spherical |
| 15 | 51.18 | 82.19 | 1 | | | | Spherical |
| 16 | 1000.00 | −150.00 | 1 | | −64.67 | −45.0 | Aspheric |
| 17 | | | | | 10.0 | 25.0 | Polynomial Free-Form Surface |

The figure of the rotationally symmetric aspheric surface employed as the 16$^{th}$ surface is specified by giving k, A, B, and C in the following well known aspheric equation:

$$Z = c \cdot r^2 / [1 + \sqrt{\{1-(1+k)c^2 r^2\}}] + A r^4 + B r^6 + C r^8$$

where Z is an axial depth, c is a paraxial radius of curvature, r is the distance from an optical axis in a direction perpendicular thereto, k is a conic constant, and A, B, and C are higher-order aspheric coefficients. The same applies to the following embodiments.

The aspheric coefficients of the 16$^{th}$ surface are given in Table 4.

TABLE 4

| | |
|---|---|
| Conic Constant: k | 90.301 |
| 4$^{th}$-order Coefficient: A | 4.12759E−08 |
| 6$^{th}$-order Coefficient: B | −5.10327E−12 |
| 8$^{th}$-order Coefficient: C | 4.43120E−16 |

The coefficient values of the 17$^{th}$ surface, which is a polynomial free-form surface, are given in Table 5.

TABLE 5

| Coefficient | Coefficient Value |
|---|---|
| X2 | 6.11879E−03 |
| Y2 | 4.61411E−03 |
| X2Y | 4.16197E−05 |
| Y3 | 2.53381E−05 |
| X4 | −3.53627E−08 |
| X2Y2 | 2.62702E−07 |
| Y4 | 1.81518E−07 |
| X4Y | −9.91605E−10 |
| X3Y2 | −3.16955E−11 |
| Y5 | 1.39821E−09 |
| X6 | 3.21795E−12 |
| X4Y2 | −5.09377E−12 |
| X2Y4 | −5.59615E−12 |
| Y6 | 7.45481E−12 |

[Embodiment 3]

Figure 13:
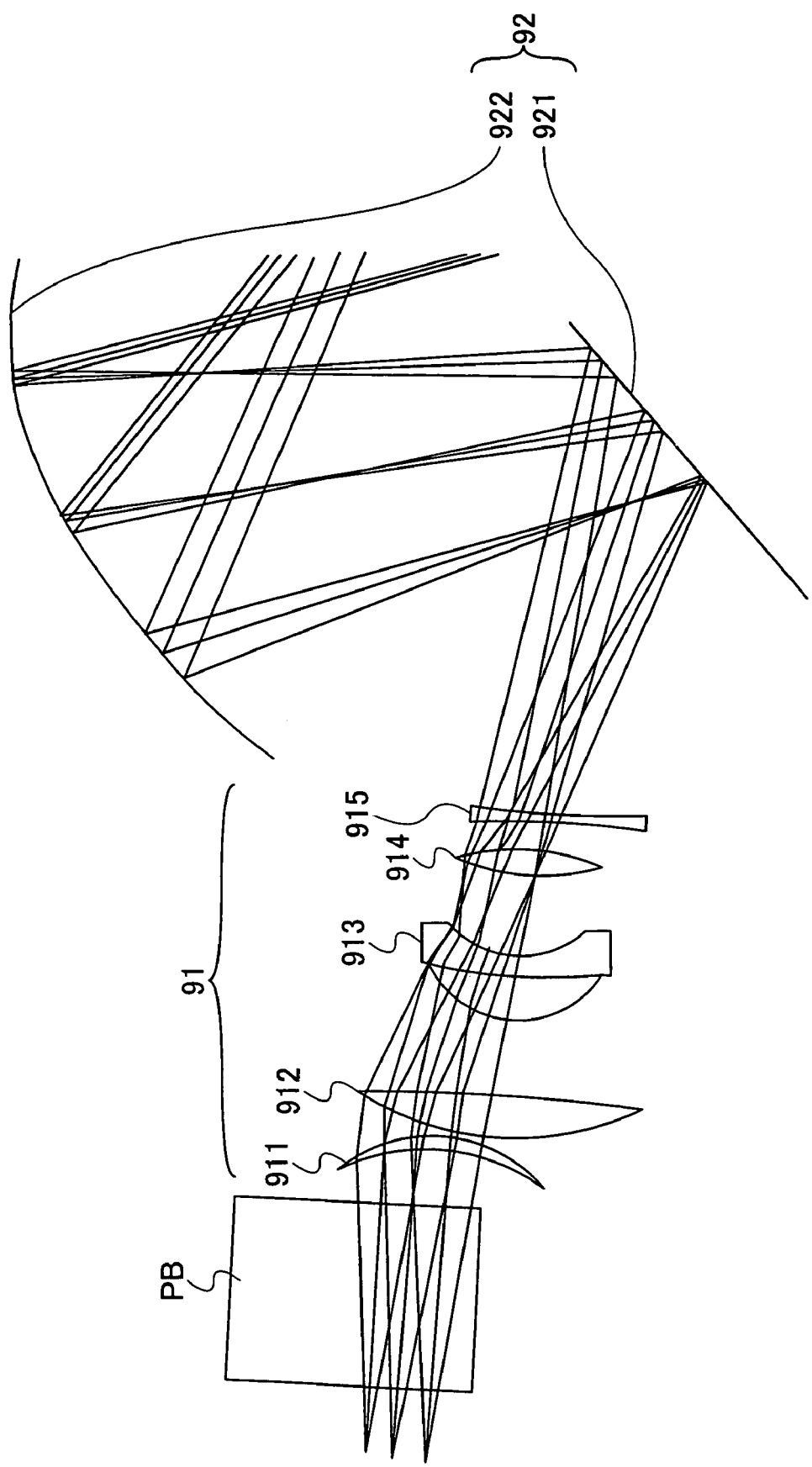
FIG. 13 is a diagram for illustrating an image projection apparatus according to an embodiment of the present invention.

Embodiment 3 is a specific embodiment of an image projection apparatus and a projection optical system shown in FIG. 13.

The projection optical system includes a first optical system 91 and a second optical system 92. The first optical system 91 is composed of five lenses 911 through 915. The second optical system 92 is formed of two reflecting surfaces 921 and 922. The lens 913 is a doublet. A diaphragm (not graphically represented) is provided between the lenses 913 and 914.

Like in Embodiments 1 and 2, an intermediate image is formed between the reflecting surfaces 921 and 922. The intermediate image is formed as an inverted image by the first optical system 91. The reflecting surface 921, which has positive power and reflects a light beam made incident on the second optical system 92 first, has a spherical figure. The reflecting surface 922 is a polynomial free-form surface.

The data of Embodiment 3 is shown in Table 6.

TABLE 6

| Surface No. | Radius of Curvature | Surface Separation | Refractive Index | Dispersion | Shift | Tilt | Figure |
|---|---|---|---|---|---|---|---|
| 0 | ∞ | 10.00 | | | | 6.5 | |
| 1 | ∞ | 34.30 | 1.516798 | 64.1983 | | | |
| 2 | ∞ | 10.00 | 1 | 0 | | | |
| 3 | −41.55 | 3.85 | 1.696802 | 55.4597 | −9.32 | 2.2 | Spherical |
| 4 | −30.93 | 1.50 | 1 | 0 | | | Spherical |
| 5 | 52.03 | 6.65 | 1.696802 | 55.4597 | −10.85 | | Spherical |
| 6 | −4072.62 | 15.54 | 1 | 0 | | | Spherical |
| 7 | 19.64 | 9.07 | 1.487489 | 70.4412 | −2.17 | | Spherical |
| 8 | 174.75 | 3.86 | 1.846663 | 23.7848 | | | Spherical |
| 9 | 17.83 | 7.50 | 1 | 0 | | | Spherical |
| 10 Diaphragm | ∞ | 2.74 | 1 | 0 | | | |
| 11 | 36.07 | 3.07 | 1.834001 | 37.3451 | −1.32 | | Spherical |
| 12 | −177.66 | 8.26 | 1 | 0 | | | Spherical |
| 13 | −33.64 | 0.65 | 1.487489 | 70.4412 | 0.72 | | Spherical |
| 14 | −111.32 | 50.00 | 1 | 0 | | | Spherical |
| 15 | 3000.00 | −140.00 | 1 | 0 | −46.57 | −45.0 | Spherical |
| 16 | | | 1 | 0 | −64.67 | −45.0 | Polynomial Free-Form Surface |

As is apparent from Table 6, the first surface of the lens 911 (the $3^{rd}$ surface in Table 6) is tilted 2.2 degrees. Meanwhile, the lenses 912 through 915 are not tilted but shifted with respect to the optical axis of the lens 911. The lens 913 of the dioptric system is a doublet, which acts as a group.

The coefficient values of the $16^{th}$ surface, which is a polynomial free-form surface, are shown in Table 7.

TABLE 7

| Coefficient | Coefficient Value |
|---|---|
| X2 | 7.45075E+11 |
| Y2 | 5.93127E+11 |
| X2Y | 6.02215E+07 |
| Y3 | 4.60347E+07 |
| X4 | 8.71082E+04 |
| X2Y2 | 4.41306E+05 |
| Y4 | 4.54450E+05 |

TABLE 7-continued

| Coefficient | Coefficient Value |
|---|---|
| X4Y | 3.01303E+03 |
| X3Y2 | 1.30460E+03 |
| Y5 | 3.27666E+03 |
| X6 | 1.09946E+01 |
| X4Y2 | 4.38811E+01 |
| X2Y4 | 1.35219E+01 |
| Y6 | 1.53991E+00 |

[Embodiment 4]

Embodiment 4 has the same optical configuration as Embodiment 3 (FIG. 13), but has different data.

The data of Embodiment 4 is shown in Table 8.

TABLE 8

| Surface No. | Radius of Curvature | Surface Separation | Refractive Index | Dispersion | Shift | Tilt | Figure |
|---|---|---|---|---|---|---|---|
| 0 | ∞ | 10.00 | | | | 6.5 | |
| 1 | ∞ | 34.30 | 1.516798 | 64.1983 | | | |
| 2 | ∞ | 10.00 | 1 | 0 | | | |
| 3 | −43.18 | 2.85 | 1.696802 | 55.4597 | −13.74 | 0.6 | Spherical |
| 4 | −29.34 | 1.50 | 1 | 0 | | | Spherical |
| 5 | 61.46 | 7.25 | 1.696802 | 55.4597 | −10.00 | | Spherical |
| 6 | −368.49 | 15.54 | 1 | 0 | | | Spherical |
| 7 | 20.42 | 8.27 | 1.487489 | 70.4412 | −1.71 | | Spherical |
| 8 | 158.23 | 3.75 | 1.846663 | 23.7848 | | | Spherical |
| 9 | 18.54 | 4.76 | 1 | 0 | | | Spherical |
| 10 Diaphragm | ∞ | 10.32 | 1 | 0 | 5.00 | | |
| 11 | 45.42 | 2.98 | 1.834001 | 37.3451 | −1.26 | | Spherical |
| 12 | −120.79 | 7.52 | 1 | 0 | | | Spherical |
| 13 | −91.19 | 0.55 | 1.487489 | 70.4412 | −4.68 | | Spherical |
| 14 | 118.18 | 50.00 | 1 | 0 | | | Spherical |
| 15 | 3000.00 | −140.00 | 1 | 0 | −38.18 | −45.0 | Spherical |
| 16 | | | 1 | 0 | −64.67 | −45.0 | Polynomial Free-Form Surface |

The coefficient values of the 16$^{th}$ surface, which is a polynomial free-form surface, are shown in Table 9.

TABLE 9

| Coefficient | Coefficient Value |
|---|---|
| X2 | 7.77494E−03 |
| Y2 | 6.11413E−03 |
| X2Y | 6.97088E−05 |
| Y3 | 5.28322E−05 |
| X4 | −1.09108E−07 |
| X2Y2 | 5.14945E−07 |
| Y4 | 5.13271E−07 |
| X4Y | −4.03993E−09 |
| X3Y2 | 2.45390E−09 |
| Y5 | 3.04301E−09 |
| X6 | 9.74181E−12 |
| X4Y2 | −7.12811E−11 |
| X2Y4 | −2.11334E−11 |
| Y6 | 1.03287E−11 |

[Embodiment 5]

Embodiment 5 has the same optical configuration as Embodiment 3 (FIG. 13) but has different data.

The data of Embodiment 5 is shown in Table 10.

TABLE 10

| Surface No. | Radius of Curvature | Surface Separation | Refractive Index | Dispersion | Shift | Tilt | Figure |
|---|---|---|---|---|---|---|---|
| 0 | ∞ | 10.00 | | | | | |
| 1 | ∞ | 34.30 | 1.516798 | 64.1983 | | | |
| 2 | ∞ | 10.00 | 1 | 0 | | | |
| 3 | −33.48 | 0.80 | 1.696802 | 55.4597 | −9.32 | −4.2 | Spherical |
| 4 | −28.97 | 1.50 | 1 | 0 | | | Spherical |
| 5 | 116.57 | 8.85 | 1.696802 | 55.4597 | −10.85 | | Spherical |
| 6 | −61.93 | 15.54 | 1 | 0 | | | Spherical |
| 7 | 81.87 | 9.38 | 1.487489 | 70.4412 | −2.17 | | Spherical |
| 8 | −36.19 | 2.11 | 1.846663 | 23.7848 | | | Spherical |
| 9 | −63.01 | 14.39 | 1 | 0 | | | Spherical |
| 10 Diaphragm | ∞ | 10.20 | 1 | 0 | | | |
| 11 | 19.82 | 7.50 | 1.834001 | 37.3451 | −1.32 | | Spherical |
| 12 | 16.21 | 21.23 | 1 | 0 | | | Spherical |
| 13 | −11.77 | 7.37 | 1.487489 | 70.4412 | 0.72 | | Spherical |
| 14 | −15.25 | 50.00 | 1 | 0 | | | Spherical |
| 15 | 5000.00 | −140.00 | 1 | 0 | −44.10 | −45.0 | Spherical |
| 16 | | 700.00 | 1 | 0 | 10.00 | 27.0 | Polynomial Free-Form Surface |

The coefficient values of the 16$^{th}$ surface, which is a polynomial free-form surface, are shown in Table 11.

TABLE 11

| Coefficient | Coefficient Value |
|---|---|
| X2 | 6.54399E−03 |
| Y2 | 5.58060E−03 |
| X2Y | 5.34322E−05 |
| Y3 | 4.38966E−05 |
| X4 | −6.71655E−08 |
| X2Y2 | 3.76878E−07 |
| Y4 | 2.54814E−07 |
| X4Y | −1.63976E−09 |
| X3Y2 | 1.70448E−09 |
| Y5 | −7.72777E−11 |
| X6 | 1.01693E−11 |
| X4Y2 | −3.04830E−11 |
| X2Y4 | −1.70416E−11 |
| Y6 | −4.26270E−13 |

As described above, each of Embodiments 1 through 5 includes a positive-power first optical system including at least one dioptric system and a second optical system having positive power as a whole, the second optical system including at least one reflecting surface having power. The first and second optical systems are arranged in the order described from upstream to downstream on the downstream side of an object. An object image is temporarily formed as an intermediate image, and thereafter, is formed as a final image. With respect to the optical axis of an optical element that is positioned furthest on the object side in the first optical system and has refractive power, one or more of the other optical elements are shifted or tilted. In Embodiments 3 through 5, with respect to the optical axis of the optical element (lens) 911, positioned furthest on the object side in the first optical system and having refractive power, the other optical elements 912 through 915 of the first optical system 91 are not tilted.

In Embodiments 3 and 4, the first optical system 91 is composed of two or more groups. Of the two or more groups, the lens 913, forming a group as a doublet is shifted.

In each of Embodiments 1 through 5, at least one of the reflecting surfaces included in the second optical system is a free-form surface. Of the reflecting surfaces included in the second optical system, the reflecting surface positioned furthest on the side of the position at which the final image is formed is a free-form surface. Further, in Embodiments 1 through 5, the reflecting surface having positive power and reflecting a light beam made incident on the second optical system first is rotationally symmetric. In Embodiments 1 and 3 through 5, the rotationally symmetric reflecting surface is a spherical reflecting surface.

In each of Embodiments 1 through 5, the first optical system is formed of only a dioptric system, and the dioptric system of the first optical system excludes an aspheric surface figure.

Accordingly, an image projection apparatus is realized by combining an object with the projection optical system of any of Embodiments 1 through 5.

[Embodiment 6]

Embodiment 6 is a specific embodiment of the projection optical system and the image projection apparatus described with reference to FIGS. 9 and 10.

The data of Embodiment 6 is shown in Table 12.

TABLE 12

| Surface No. | Radius of Curvature | Surface Separation | Refractive Index | Dispersion | Figure | Shift | Tilt |
|---|---|---|---|---|---|---|---|
| 0 | ∞ | 22 | 1 | | Plane | | |
| 1 | ∞ | 34.3 | 1.62 | 59.51 | Plane | | |
| 2 | ∞ | 7.1 | 1 | | Plane | | |
| 3 | −94 | 5.06 | 1.74 | 44.9 | Spherical | 8.22 | 0.264 |
| 4 | −42.9 | 0.1 | 1 | | Spherical | | |
| 5 | 140.1 | 5.02 | 1.53 | 66.01 | Spherical | | |
| 6 | −106.3 | 1.95 | 1 | | Spherical | | |
| 7 | 54.2 | 15.69 | 1.5 | 69.24 | Aspheric | | |
| 8 | −39.6 | 17.47 | 1.76 | 27.59 | Spherical | | |
| 9 | 41.2 | 21.71 | 1 | | Spherical | | |
| 10 | −79.3 | 5.74 | 1.75 | 34.1 | Spherical | | |
| 11 | −33 | 1.35 | 1 | | Spherical | | |
| 12 Diaphragm | ∞ | 93.3 | 1 | | Plane | | |
| 13 | −50.6 | 25 | 1.63 | 57.93 | Spherical | | |
| 14 | −159.1 | 42.86 | 1 | | Spherical | | |
| 15 | 186.7 | 25 | 1.68 | 31.56 | Aspheric | | |
| 16 | 96.1 | 47.89 | 1.56 | 63.6 | Spherical | | |
| 17 | −553.4 | 50 | 1 | | Spherical | | |
| 18 | 212.4 | 25 | 1.72 | 35.45 | Spherical | | |
| 19 | 157.6 | 185 | 1 | | Polynomial Free-Form Surface | | |
| 20 | 10000 | −266 | 1 | | Axially Symmetric Reflecting Surface | 13.68 | 46 |
| 21 | 0 | 780.85 | 1 | | Polynomial Free-Form Surface | 77.69 | −32.9 |

The aspheric coefficients of the $7^{th}$ and $15^{th}$ surfaces are given in Table 13.

TABLE 13

| Coefficient | $7^{th}$ Surface | $15^{th}$ Surface |
|---|---|---|
| K | 0 | 0.286791 |
| A | −1.35E−06 | −6.00E−09 |
| B | −1.56E−09 | −1.22E−11 |
| C | 2.72E−13 | 8.92E−16 |
| D | −4.35E−15 | 1.40E−20 |
| E | 0.00E+00 | 4.55E−23 |
| F | 0.00E+00 | −1.29E−26 |
| G | 0.00E+00 | 7.10E−31 |
| H | 0.00E+00 | 1.73E−34 |
| I | 0.00E+00 | −1.83E−38 |

The coefficient values of the $19^{th}$ and $21^{st}$ surfaces, which are polynomial free-form surfaces, are given in Table 14.

TABLE 14

| Coefficient | $19^{th}$ Surface | $21^{st}$ Surface |
|---|---|---|
| X2 | −0.00095 | 0.002876 |
| Y2 | −0.00096 | 0.00173 |
| X2Y | −1.94E−07 | −1.03E−05 |
| Y3 | −3.80E−07 | −5.02E−06 |
| X4 | −1.06E−07 | 3.07E−09 |
| X2Y2 | −2.11E−07 | 5.56E−08 |
| Y4 | −1.01E−07 | 2.42E−08 |
| X4Y | 5.54E−11 | 1.17E−11 |
| Y5 | −4.67E−11 | −1.45E−10 |
| X6 | −7.62E−14 | −1.72E−15 |
| X4Y2 | −8.23E−13 | −7.17E−13 |
| X2Y4 | −1.19E−16 | 1.19E−13 |
| Y6 | 1.20E−13 | 6.52E−13 |

MTF performance and distortion on a screen by the projection optical system of Embodiment 6 are 5.60% or higher and 2% or lower, respectively, at a frequency of 0.5 c/mm.

In Embodiment 6, the screen onto which a normal image is projected is 60 inches in size. The maximum width of the projection optical system in a direction perpendicular to the screen is 472 mm.

Figure 14:
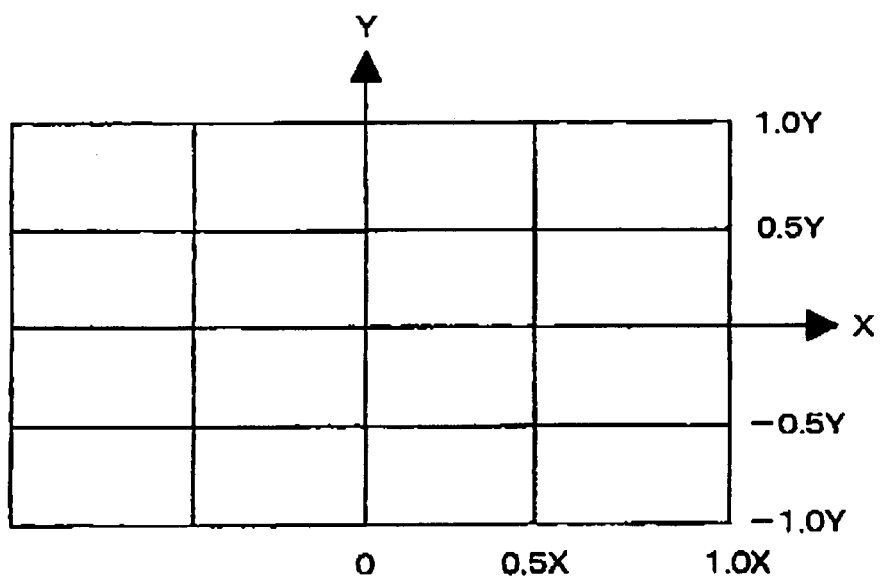
FIG. 14 is a diagram for illustrating MTF evaluation points on a screen according to an embodiment of the present invention.

MTF performance at an evaluation frequency of 0.5 c/mm was examined, setting grid lines of ±1.0Y, ±0.5Y, 0.0Y, ±1.0X, ±0.5X, and 0.0X along the X axis (rightward and leftward directions) and the Y axis (upward and downward directions) on the screen as shown in FIG. 14. Table 15 shows the results (MTF values) of the examination.

TABLE 15

| | 0.0X | 0.5X | 1.0X |
|---|---|---|---|
| 1.0Y | 76.7% | 74.3% | 73.4% |
| 0.5Y | 71.5% | 74.7% | 75.4% |
| 0.0Y | 83.1% | 82.1% | 79.7% |
| −0.5Y | 91.2% | 85.0% | 83.9% |
| −0.1Y | 92.6% | 71.6% | 83.1% |

Figure 15:
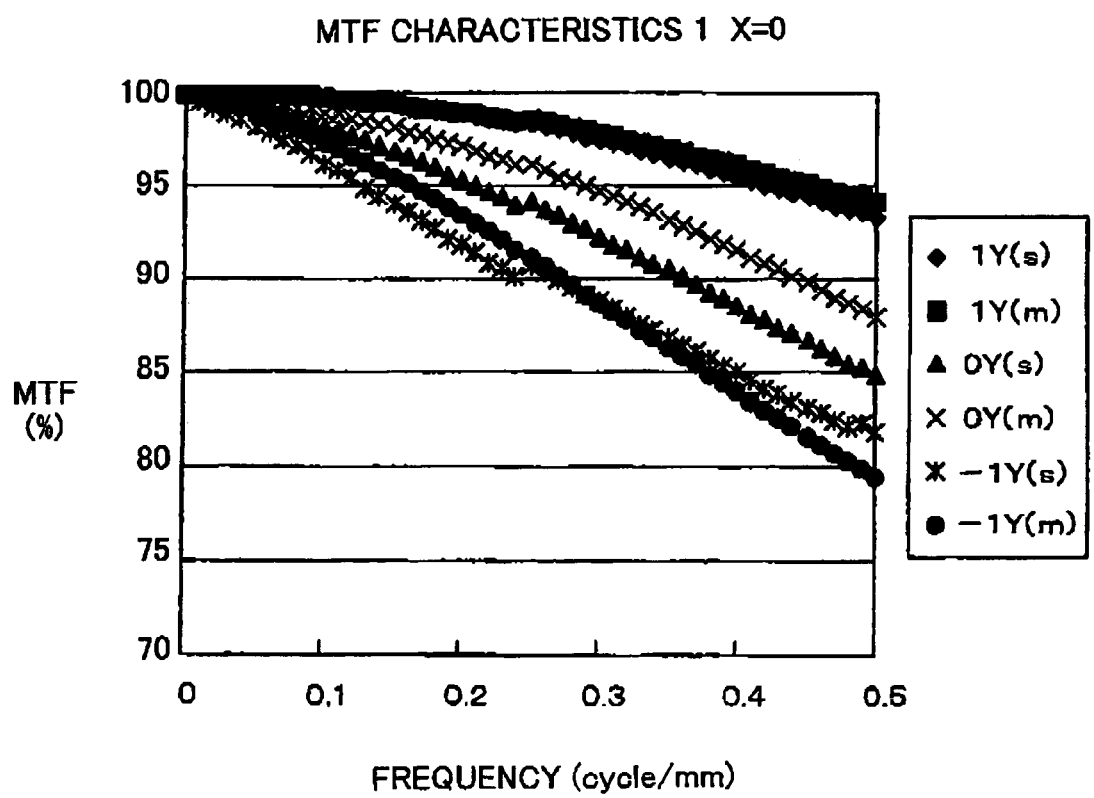
FIG. 15 is a graph showing MTF characteristics according to an embodiment of the present invention.
Figure 16:
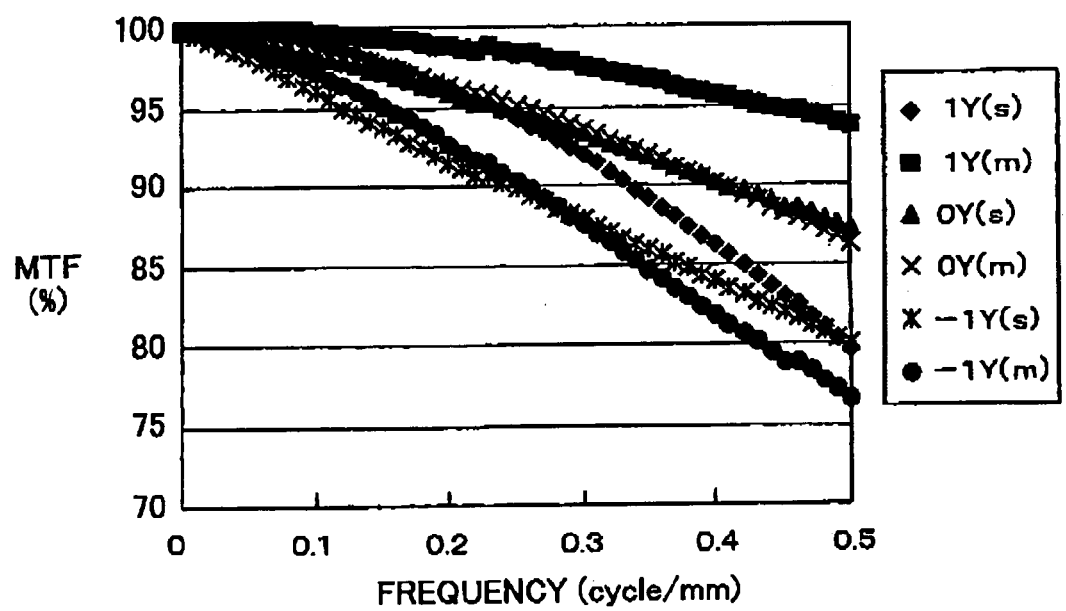
FIG. 16 is a graph showing MTF characteristics according to an embodiment of the present invention.
Figure 17:
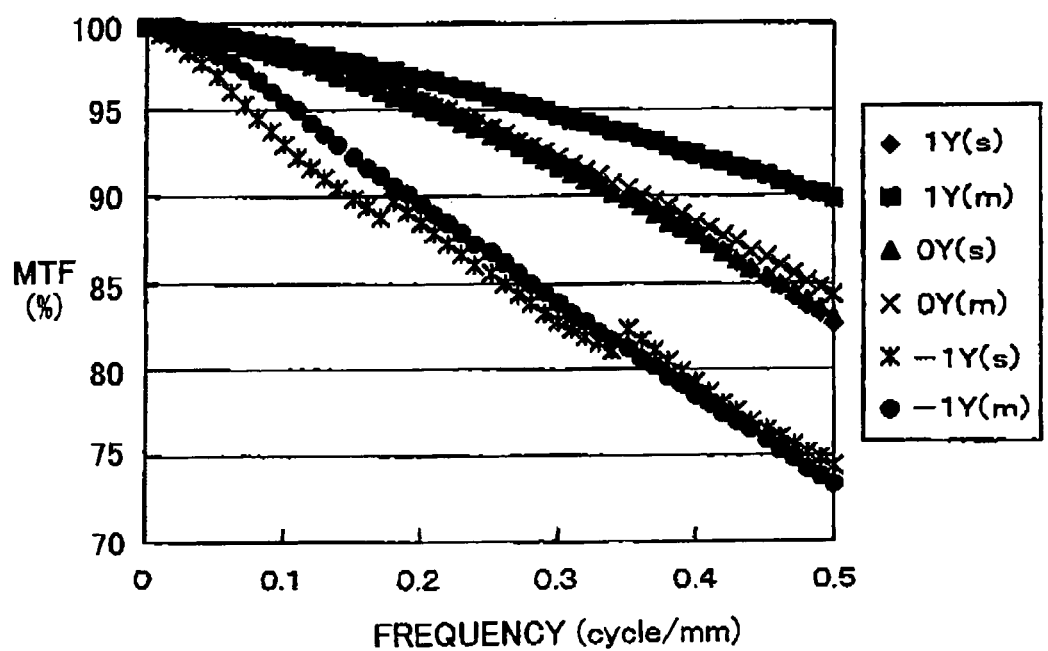
FIG. 17 is a graph showing MTF characteristics according to an embodiment of the present invention.

FIG. 15 shows MTF characteristics in the saggital direction (s) and the meridional direction (m) at ±1.0Y and 0.0Y in the range of frequencies of 0 to 0.5 c/mm at X=0.0X. FIG. 16 shows MTF characteristics in the saggital direction (s) and the meridional direction (m) at ±1.0Y and 0.0Y in the range of frequencies of 0 to 0.5 c/mm at X=0.5X. FIG. 17 shows MTF characteristics in the saggital direction (s) and the meridional direction (m) at ±1.0Y and 0.0Y in the range of frequencies of 0 to 0.5 c/mm at X=1.0X. FIGS. 15 through 17 show that Embodiment 6 has good MTF characteristics.

According to the projection optical system of Embodiment 6, a reflection dioptric system includes first and second reflecting mirrors arranged in the order described from upstream to downstream on the downstream side of the transmission dioptric system, and the intermediate image surface of a projected object surface is positioned between the first and second reflecting mirrors. The first reflecting mirror has a negative-power, axially symmetric reflecting surface (the $22^{nd}$ surface). The second reflecting mirror has an anamorphic polynomial free-form surface having different vertical and lateral powers (the $23^{rd}$ surface). An anamorphic polynomial free-form surface having different vertical and lateral powers (the $19^{th}$ surface) is provided in the transmission dioptric system as a part correcting the aspect ratio of the intermediate image surface of a projected object surface.

It is possible to correct the aspect ratio of the intermediate image through the figure of a reflecting mirror in the reflection dioptric system. However, it is desirable that the figure of the reflecting mirror of the reflection dioptric system be determined mainly in terms of distortion correction. Accordingly, it is desirable that the aspect ratio be adjustable beforehand in the transmission dioptric system. Accordingly, it is effective to employ the above-described anamorphic polynomial free-form surface as a part correcting the aspect ratio in the transmission dioptric system.

The number of polynomial free-form surfaces employed in the transmission dioptric system is not limited to one. However, according to Embodiment 6, the employment of only the single polynomial free-form surface (the $19^{th}$ surface) in the transmission dioptric system produced sufficient correction effect. The polynomial free-form surface employed in the transmission dioptric system may be positioned close to the projected object surface. However, it is desirable that the polynomial free-form surface be positioned close to the projection surface side in the transmission dioptric system in order to increase the correction effect.

In the transmission dioptric system, an NA (=0.143) on the projected object surface side is greater than an NA (=0.01) on the intermediate image surface side. The magnification of the intermediate image M1 (=1.5) falls within the range of 1 to 5. The magnification of projection (=75×) is 40× or higher. The angle of projection to a projection surface θ (=11 degrees) is 5 degrees or greater.

In the case of forming the transmission dioptric system, its NA on the projected object surface side (hereinafter, an NA1) is determined by the orientation distribution characteristics of an illumination system, while its NA on the intermediate image surface side (hereinafter, an NA2) is changeable by the arrangement and the configuration of the transmission dioptric system. In order to increase magnification of projection, it is effective to increase the power of the reflection dioptric system. This, however, reduces the focal length of the reflection dioptric system on its image or downstream side so that the focal point of light beams is shifted to the reflecting mirror side of the reflection dioptric system. As a result, only a small-size final image can be formed. That is, magnification is reduced. In order to eliminate this disadvantage, the NA2 of light beams incident on the reflection dioptric system was focused on. As a result, it was determined that making the NA2 smaller than the NA1 had a remarkable effect in increasing the projection optical system magnification.

It was determined that the NA 2 might be 0.005 to 0.01 to realize a magnification projection optical system magnifying and projecting the image of a projected object surface of 0.9 inch diagonal size onto a 60-inch screen with a thickness of 500 mm or less. If the NA2 is overly reduced, the overall length of the transmission dioptric system increases. Accordingly, the NA2 is desirably 0.005 to 0.01, considering the downsizing of the entire apparatus.

If the NA2 is set to 0.01 or greater, the transmission dioptric system is made compact. However, an increase in the NA tends to make it difficult to perform distortion correction on the projection screen or ensure magnification performance. The upper limit of the NA2 may be 0.01 or greater for a screen size smaller than 60 inches.

The image projection apparatus of the present invention may be of a front projector type or of a rear projection type with a folding mirror folding back an imaging optical path.

The present invention is not limited to the specifically disclosed embodiments, and variations and modifications may be made without departing from the scope of the present invention.

The present application is based on Japanese priority patent applications No. 2003-029595, filed on Feb. 6, 2003, No. 2003-029602, filed on Feb. 6, 2003, and No. 2003-409304, filed on Dec. 8, 2003, the entire contents of which are hereby incorporated by reference.

What is claimed is:

1. A projection optical system guiding and projecting a light beam from a projected object surface onto a projection surface in an upstream-downstream direction through a transmission dioptric system and a reflection dioptric system of one or two reflecting mirrors, wherein:
    the transmission dioptric system includes a plurality of transmission refractive elements;
    substantial telecentricity is provided from the projected object surface up to a first surface of the transmission dioptric system;
    an intermediate image surface of the projected object surface is positioned closer to the reflection dioptric system than to the transmission dioptric system, and an intermediate image on the intermediate image surface is formed as a final image on the projection surface via the reflecting mirrors;
    the reflecting mirrors include at least one anamorphic polynomial free-form surface having different vertical and lateral powers;
    a light beam from the reflection dioptric system to the projection surface is guided at an angle to a normal of the projection surface; and
    the transmission dioptric system is decentered with respect to a normal of the projected object surface, and the transmission refractive elements of the transmission dioptric system are prevented from being decentered with respect to each other.

2. The projection optical system as claimed in claim 1, wherein:
    the reflection dioptric system includes first and second reflecting mirrors arranged in an order described from upstream to downstream on a downstream side of the transmission dioptric system;
    the intermediate image surface of the projected object surface is positioned between the first and second reflecting mirrors; and
    the first reflecting mirror includes an axially symmetric reflecting surface having negative power, and the second reflecting mirror includes an anamorphic polynomial free-form surface having different vertical and lateral powers.

3. The projection optical system as claimed in claim 1, comprising an anamorphic polynomial free-form surface having different vertical and lateral powers in the transmission dioptric system as a part correcting an aspect ratio of the intermediate image of the projected object surface.

4. The projection optical system as claimed in claim 1, wherein an NA in the transmission dioptric system is greater on an upstream side thereof than on the downstream side thereof.

5. The projection optical system as claimed in claim 1, wherein the intermediate image surface is tilted and curved with respect to a principal ray of a light beam emitted from a center of the projected object surface.

6. The projection optical system as claimed in claim 1, wherein a principal ray emitted from a center of the projected object surface and a principal ray emitted from a margin of the projected object surface are parallel to each other in a last surface of the transmission dioptric system.

7. The projection optical system as claimed in claim 1, wherein magnification of the intermediate image falls in a range of 1 to 5.

8. The projection optical system as claimed in claim 1, wherein magnification of projection is 40× or higher.

9. The projection optical system as claimed in claim 8, wherein an angle of projection to the projection surface is 5° or greater.

10. A projection optical system guiding and projecting a light beam from a projected object surface onto a projection surface in an upstream-downstream direction through a transmission dioptric system and a reflection dioptric system of one or two reflecting mirrors, wherein:
the transmission dioptric system includes a plurality of transmission refractive elements;
substantial telecentricity is provided from the projected object surface up to a first surface of the transmission dioptric system;
an intermediate image surface of the projected object surface is positioned closer to the reflection dioptric system than to the transmission dioptric system, and an intermediate image on the intermediate image surface is formed as a final image on the projection surface via the reflecting mirrors;
the reflecting mirrors include at least one anamorphic polynomial free-form surface having different vertical and lateral powers;
a light beam from the reflection dioptric system to the projection surface is guided at an angle to a normal of the projection surface; and
the transmission dioptric system is decentered with respect to a normal of the projected object surface, and the transmission refractive elements of the transmission dioptric system are prevented from being decentered with respect to each other at a group unit level.

11. The projection optical system as claimed in claim 10, wherein:
the reflection dioptric system includes first and second reflecting mirrors arranged in an order described from upstream to downstream on a downstream side of the transmission dioptric system;
the intermediate image surface of the projected object surface is positioned between the first and second reflecting mirrors; and
the first reflecting mirror includes an axially symmetric reflecting surface having negative power, and the second reflecting mirror includes an anamorphic polynomial free-form surface having different vertical and lateral powers.

12. The projection optical system as claimed in claim 10, comprising an anamorphic polynomial free-form surface having different vertical and lateral powers in the transmission dioptric system as a part correcting an aspect ratio of the intermediate image of the projected object surface.

13. The projection optical system as claimed in claim 10, wherein an NA in the transmission dioptric system is greater on an upstream side thereof than on the downstream side thereof.

14. The projection optical system as claimed in claim 10, wherein the intermediate image surface is tilted and curved with respect to a principal ray of a light beam emitted from a center of the projected object surface.

15. The projection optical system as claimed in claim 10, wherein a principal ray emitted from a center of the projected object surface and a principal ray emitted from a margin of the projected object surface are parallel to each other in a last surface of the transmission dioptric system.

16. The projection optical system as claimed in claim 10, wherein magnification of the intermediate image falls in a range of 1 to 5.

17. The projection optical system as claimed in claim 10, wherein magnification of projection is 40× or higher.

18. The projection optical system as claimed in claim 17, wherein an angle of projection to the projection surface is 5° or greater.

19. An image projection apparatus magnifying an image displayed on a projected object surface and projecting the magnified image on a projection surface by a projection optical system, wherein:
the projection optical system guides and projects a light beam from the projected object surface onto the projection surface in an upstream-downstream direction through a transmission dioptric system and a reflection dioptric system of one or two reflecting mirrors;
the transmission dioptric system includes a plurality of transmission refractive elements;
substantial telecentricity is provided from the projected object surface up to a first surface of the transmission dioptric system;
an intermediate image surface of the projected object surface is positioned closer to the reflection dioptric system than to the transmission dioptric system, and an intermediate image on the intermediate image surface is formed as a final image on the projection surface via the reflecting mirrors;
the reflecting mirrors include at least one anamorphic polynomial free-form surface having different vertical and lateral powers;
a light beam from the reflection dioptric system to the projection surface is guided at an angle to a normal of the projection surface; and
the transmission dioptric system is decentered with respect to a normal of the projected object surface, and the transmission refractive elements of the transmission dioptric system are prevented from being decentered with respect to each other.

20. The image projection apparatus as claimed in claim 19, wherein the image projection apparatus is of a front projector type.

21. The image projection apparatus as claimed in claim 19, wherein the image projection apparatus is of a rear projector type, comprising a folding mirror folding back an imaging optical path.

22. An image projection apparatus magnifying an image displayed on a projected object surface and projecting the magnified image on a projection surface by a projection optical system, wherein:
the projection optical system guides and projects a light beam from the projected object surface onto the projection surface in an upstream-downstream direction through a transmission dioptric system and a reflection dioptric system of one or two reflecting mirrors;

the transmission dioptric system includes a plurality of transmission refractive elements;

substantial telecentricity is provided from the projected object surface up to a first surface of the transmission dioptric system;

an intermediate image surface of the projected object surface is positioned closer to the reflection dioptric system than to the transmission dioptric system, and an intermediate image on the intermediate image surface is formed as a final image on the projection surface via the reflecting mirrors;

the reflecting mirrors include at least one anamorphic polynomial free-form surface having different vertical and lateral powers;

a light beam from the reflection dioptric system to the projection surface is guided at an angle to a normal of the projection surface; and the transmission dioptric system is decentered with respect to a normal of the projected object surface, and the transmission refractive elements of the transmission dioptric system are prevented from being decentered with respect to each other at a group unit level.

23. The image projection apparatus as claimed in claim 22, wherein the image projection apparatus is of a front projector type.

24. The image projection apparatus as claimed in claim 22, wherein the image projection apparatus is of a rear projector type, comprising a folding mirror folding back an imaging optical path.

* * * * *